United States Patent [19]

Meece

[11] 4,150,384

[45] Apr. 17, 1979

[54] METHOD AND APPARATUS FOR SYNCHRONIZING CHARGING OF DROPLETS OF A PRESSURIZED CONDUCTIVE LIQUID STREAM

[75] Inventor: Kermit A. Meece, Lexington, Ky.

[73] Assignee: International Business Machines Corporation, Armonk, N.Y.

[21] Appl. No.: 843,082

[22] Filed: Oct. 17, 1977

[51] Int. Cl.[2] .............................. G01D 18/00

[52] U.S. Cl. .............................. 346/75

[58] Field of Search .............................. 346/75, 1

[56] References Cited

U.S. PATENT DOCUMENTS

| | | | |
|---|---|---|---|
| 3,562,761 | 2/1971 | Stone | 346/75 |
| 3,852,768 | 12/1974 | Carmichael | 346/75 |
| 3,969,733 | 7/1976 | DeMoss | 346/75 X |

*Primary Examiner*—Joseph W. Hartary
*Attorney, Agent, or Firm*—Frank C. Leach, Jr.

[57] ABSTRACT

The application of the voltage on a charge electrode to selectively charge droplets of a pressurized conductive ink stream is synchronized with the break off of the droplets from the stream so that the break off occurs in the third quarter of the time period during which the charge voltage is placed on the charge electrode. To determine in which quarter that break off is occurring, the charge voltage is placed on the charge electrode at the same time for two adjacent quarters of a cycle during each of the two adjacent cycles in which a disturbance is placed on the stream by drive means such as a transducer, for example, to produce two droplets. During the next application of the charge voltage on the charge electrode, the charge voltage is applied for the last of the prior two adjacent quarters and the next adjacent quarter during two adjacent droplet producing cycles. During the third application of the charge voltage on a charge electrode, the voltage is placed on the charge electrode for the last of the prior two adjacent quarters of the second application and the next adjacent quarter during each of two adjacent droplet producing cycles. The final periodic application results in the charge being placed on the charge electrode during the last of the prior two adjacent quarters of the third application and the next adjacent quarter during each of two adjacent droplet producing cycles. When the charge voltage is applied to the charge electrode at the time of break off, an optical sensor, which is disposed a predetermined distance downstream from the charge electrode, senses a gap between the two charged droplets because they will have repelled each other. This enables determination of the location of the break-off point of the stream with respect to when the charge voltage is placed on the charge electrode so that there can be synchronization between when the charge voltage is applied to the charge electrode and the break-off point of the droplets from the stream.

26 Claims, 21 Drawing Figures

METHOD AND APPARATUS FOR SYNCHRONIZING CHARGING OF DROPLETS OF A PRESSURIZED CONDUCTIVE LIQUID STREAM

In synchronous ink jet printing systems, it is necessary that there be synchronization of the application of the charge voltage placed on the charge electrode with the driving means, which causes the break up of the pressurized stream after it exits from its nozzle. Without this synchronization, the droplets may only be partially charged so that the droplets will strike the top of the gutter rather than entering the gutter. This results in contamination of the high voltage insulators of the deflection plates so that the high voltage, which is applied to the deflection plates, will arc to ground. This causes loss of control of the droplets so that all of the droplets, irrespective of whether they are charged, will strike the recording surface even though such is not desired. Therefore, the desired ink pattern will not be produced on the recording surface.

It is desired for the break off of the droplets to occur during a specific quarter of the time period during which the charging voltage is applied to the charge electrode. This break off should occur during the third quarter of the time period during which the charge voltage is placed on the charge electrode because this insures that the charge voltage has settled so as to be constant. Thus, the droplet receives the desired charge when break off occurs during the third quarter of the time period during which the charge voltage is placed on the charge electrode.

The break off of the droplets from the pressurized stream varies with the temperature of the ink, the frequency with which the ink stream is broken up, the diameter of the nozzle, and the thickness of the piezoelectric crystal transducer when such is used as the driving means. Therefore, variations in any of these can cause the break-off point of the droplets to shift. During normal operations, it is the variations in the temperature of the ink that causes the break-off point of the droplets from the pressurized stream to shift.

It has previously been suggested to synchronize the break off of the droplets with the application of the charge voltage through applying a relatively large voltage to the deflection plates to deflect the droplets past a deflection sensor. If the droplets are not properly charged, they will not pass the deflection sensor because they will not be sufficiently deflected by the deflection plates.

However, this previously suggested arrangement has had the disadvantage that the relatively high voltage on the deflection plates can charge droplets opposite in polarity to that desired if break off occurs within the deflection plates rather than the charge electrode during synchronization. This results in the oppositely charged droplets being deflected into the high voltage plate to cause contamination of the deflection plates. Another disadvantage of this previously suggested synchronization arrangement has been that the deflection sensor has not been mounted on the carrier, which supports the ink jet nozzle head, the charge electrode, and the deflection plates, whereby the carrier must be returned to a position off of the recording surface to accomplish synchronization; this requires additional space.

The present invention overcomes the disadvantages of the previously suggested arrangement in that the possibility of contamination of the deflection plates is eliminated since high deflection voltage is not on during charge synchronization. The present invention also eliminates the requirement for the carrier to be moved to a position off the recording surface since the synchronization structure is mounted on the carrier.

Another arrangement for synchronizing the application of the charge voltage and the break-off point of the droplets is shown and described in U.S. Pat. No. 3,562,761 to Stone et al. In the aforesaid Stone et al patent, two adjacent droplets are charged and then the following two droplets are not charged whereby the charged droplets are repelled from each other with each being merged with the adjacent non-charged droplet. These droplets then strike a transducer to determine their frequency.

Thus, the apparatus of the aforesaid Stone et al patent requires a relatively large number of droplets with equal amounts being charged and non-charged to obtain the desired frequency. Furthermore, the apparatus of the aforesaid Stone et al patent can only shift the phase 180°.

The present invention requires the charging of only two droplets at each of four different periodic applications of the charge voltage to the charging electrode. Therefore, a relatively large number of droplets is not required as in the aforesaid Stone et al patent.

Additionally, the present invention is capable of shifting the application of the charge voltage on the charge electrode so that the break-off point of the droplets occurs during the third quarter of the time during which the charge voltage is placed on the charge electrode. Thus, a more selective synchronization is obtainable with the present invention than in the aforesaid Stone et al patent.

The present invention obtains synchronization of the break-off point of the droplets for the pressurized ink stream with the application of the charge voltage to the charge electrode through periodically applying the charge voltage four different times for two adjacent cycles of the means, which causes the stream to cause break up to produce droplets. While each of the two adjacent cycles of the stream break-up means has the charge voltage applied at the same time during the cycle, this charge voltage is shifted one-quarter of the cycle during each periodic application of the charge voltage from the prior periodic application.

An object of this invention is to obtain synchronization of the charging of droplets with formation of the droplets from a liquid stream.

Another object of this invention is to obtain charging of the droplets of a liquid stream at a desired time during each cycle of the driver applying the break-up force of the stream.

A further object of this invention is to determine when the charge of droplets of a liquid stream is synchronized with the break-off point of the droplets from the stream through optically sensing a gap in the substantially uniform spacing of the droplets.

The foregoing and other objects, features, and advantages of the invention will be apparent from the following more particular description of a preferred embodiment of the invention as illustrated in the accompanying drawings.

Figure 1:
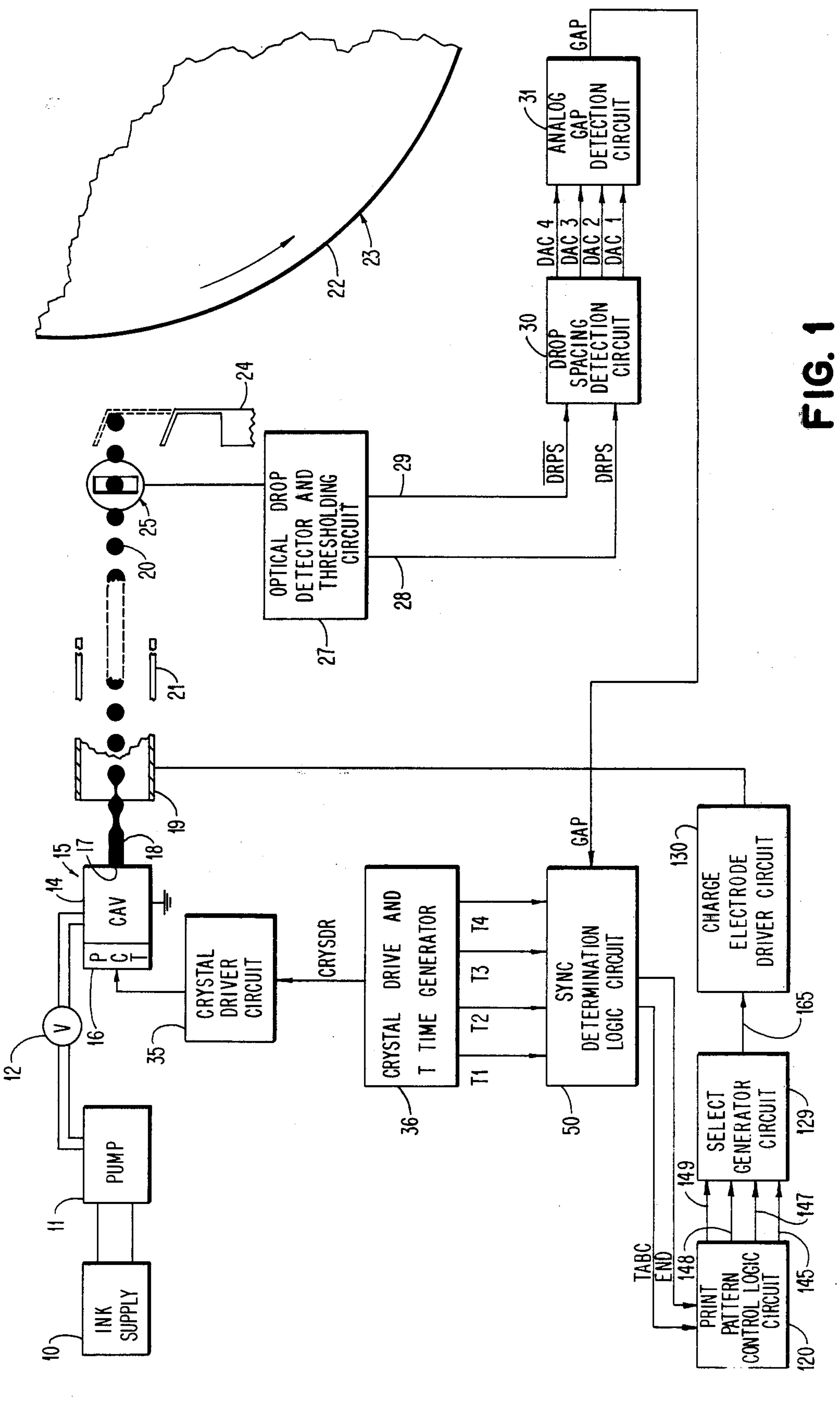
FIG. 1 is a schematic block diagram of the apparatus of the present invention for synchronizing the charging of droplets of a pressurized liquid stream.

Referring to the drawings and particularly FIG. 1, there is shown a reservoir 10 of ink supplied to a pump 11. As more particularly shown and described in the copending patent application of Kermit A. Meece et al for "Method And Apparatus For Determining The Velocity Of A Liquid Stream Of Droplets," Ser. No. 843,081, filed Oct. 17, 1977, and assigned to the same assignee as the assignee of this application, ink is supplied under pressure from the pump 11 through a valve 12, which is used to obtain starting and stopping of the flow of ink from the pump 11, to an ink cavity 14 in an ink jet head 15. The ink jet head 15, which is mounted on a carrier on which the pump 11 also is mounted, includes a piezoelectric crystal transducer 16, which applies a predetermined frequency to the pressurized ink within the ink cavity 14.

The pressure of the ink supplied from the pump 11 determines the velocity at which the ink stream flows from the ink jet head 15 through a nozzle 17 (one shown). It should be understood that the ink jet head 15 may have a plurality of the nozzles 17.

An ink jet stream 18 flows from the nozzle 17 through a charge electrode 19. The stream 18 breaks up into droplets 20 at a predetermined break-off point, which is within the charge electrode 19. Thus, each of the droplets 20 can be charged to a desired magnitude or have no charge.

When synchronizing the charging of the droplets 20 with their formation, only two of the droplets 20 are charged during a predetermined period of time. When synchronizing the charging of the droplets with their formation, the velocity of the ink jet stream 18 will have already been determined in a manner such as that shown and described in the aforesaid Meece et al application.

The droplets 20 move along a predetermined path from the charge electrode 19 to pass through a pair of deflection plates 21. If there is no charge on one of the droplets 20, the path of the non-charged droplet 20 is not altered as it passes through the deflection plates 21 so that the non-charged droplet 20 strikes a recording surface 22 such as paper, for example, on a drum 23. If the droplet 20 has been charged to a sufficient magnitude, the deflection plates 21 deflect the charged droplet 20 so that it will not strike the recording surface 22 but be deposited in a gutter 24. It should be understood that the deflection plates 21 have the voltage removed during synchronization.

The gutter 24, which is movable, is disposed between the deflection plates 21 and the drum 23. When the charging of the droplets 20 is to be synchronized with their formation, the movable gutter 24 is moved by a cam (not shown) to a position in which it will prevent any of the droplets 20 from striking the recording surface 22. The can moves the gutter 24 to this position when the carrier, which supports the reservoir 10, the pump 11, the ink jet head 15, the charge electrode 19, and the deflection plates 21, is in a home position.

When the movable gutter 24 is moved to the position in which it prevents the droplets 20 from striking the recording surface 22, it is disposed so that the droplets 20 will have passed an optical drop sensor or detector 25. The optical drop sensor 25 also is mounted on the carrier.

As more particularly shown and described in the aforesaid Meece et al application, the optical drop sensor 25 senses when each of the droplets 20 passes the optical drop sensor 25. This optical sensing of the droplet 20 by the optical drop sensor or detector 25 is changed to an electrical signal by an optical drop detector and thresholding circuit 27 as more particularly shown and described in the aforesaid Meece et al application.

The optical drop detector and thresholding circuit 27 supplies a DRPS signal over a line 28 and a $\overline{\text{DRPS}}$ signal over a line 29 to a drop spacing detection circuit 30. The DRPS and the $\overline{\text{DRPS}}$ signals are inverse to each other but the same magnitude and are utilized in the drop spacing detection circuit 30, as described in the aforesaid Meece et al application, to cause the supply of DAC1, DAC2, DAC3, and DAC4 signals to an analog gap detection circuit 31.

As shown and described in the aforesaid Meece et al application, the analog gap detection circuit 31 produces a high GAP signal as an output when the count by a counter of the drop spacing detection circuit 30 of the time between the droplets 20 passing the optical sensor 25 has exceeded an average count thereof. When the GAP signal goes high, this indicates that a gap exists between the droplets 20 when they pass the optical drop sensor 25. Thus, the gap is greater than the substantially uniform distance between the droplets 20.

The transducer 16 is driven from a crystal driver circuit 35 to vibrate at the desired frequency. The crystal driver circuit 35 receives a CRYSDR signal from a crystal drive and T time generator 36.

Figure 2:
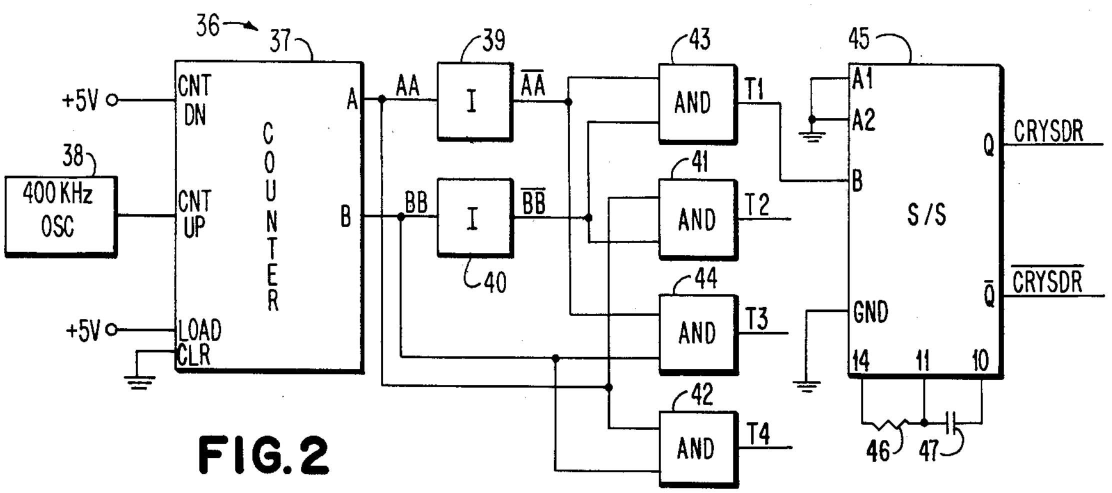
FIG. 2 is a schematic block diagram of a crystal drive and T time generator.

Referring to FIG. 2, the crystal drive and T time generator 36 includes a counter 37. One suitable example of the counter is a synchronous 4-bit up/down counter sold as model SN74193 by Texas Instruments.

The counter 37 has its CNT UP input connected to a 400 KHz oscillator 38. The counter 37 has each of its CNT DN and LOAD inputs connected to +5 volts with its CLR input grounded. The counter 37 has its A output connected to an inverter 39 and its B output connected to an inverter 40.

The counter 37 produces an AA signal on its A output for supply as one of the two inputs to each of AND gates 41 and 42. The inverter 39 supplies an $\overline{AA}$ signal, which is the same magnitude as the AA signal but inverse thereto, as its output and as one of the two inputs to each of AND gates 43 and 44.

The counter 37 has a BB signal at its B output for supply as one of the two inputs to each of the AND gates 42 and 44. The inverter 40 supplies a $\overline{BB}$ signal, which is the same magnitude as the BB signal but inverse thereto, as one of the two inputs to the AND gates 41 and 43.

Figure 3:
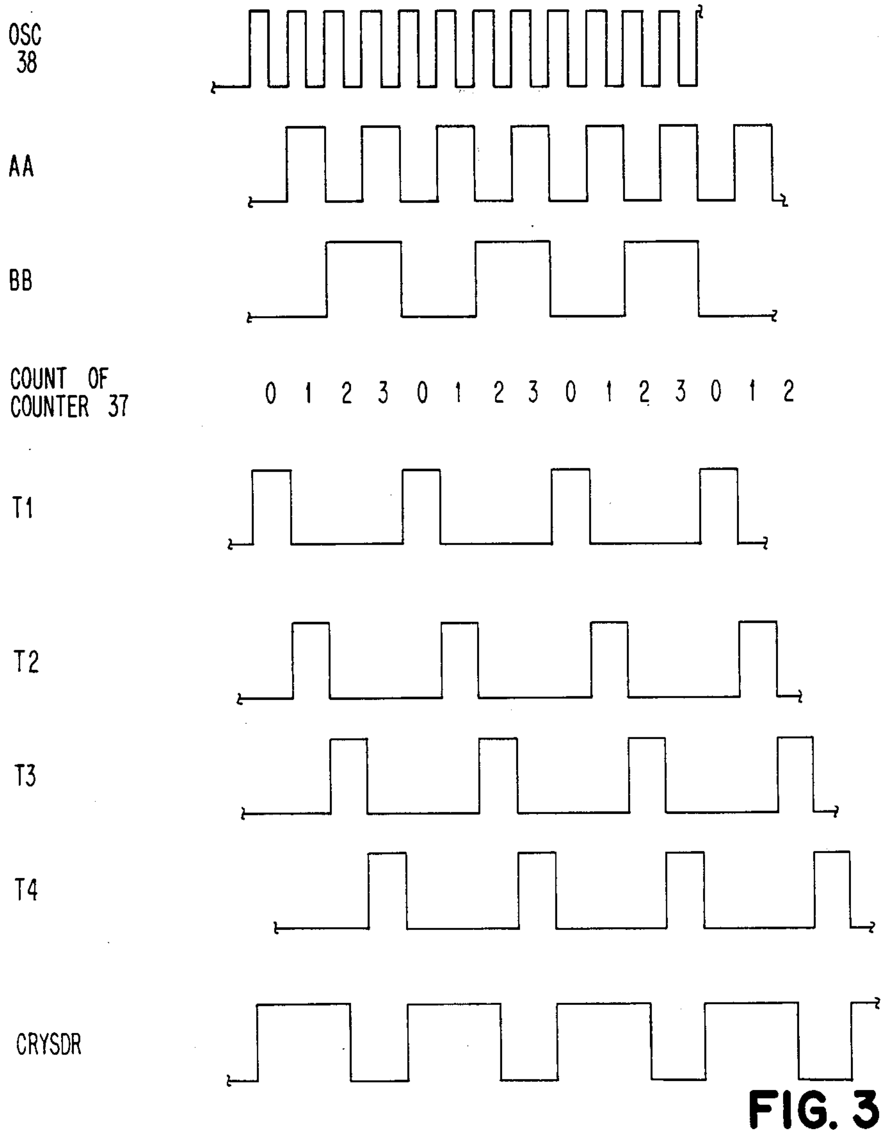
FIG. 3 is a timing diagram showing the relationship of various signals produced by the circuit of FIG. 2.

As shown in the timing diagram of FIG. 3, the counter 37 counts from 0 to 3 and then counts again with the AA signal being up on the counts of 1 and 3 and the BB signal being up on the counts of 2 and 3 since the AA signal represents one when it is high and the BB signal represents two when it is high.

When the counter 37 is at the count of 0, the $\overline{AA}$ and $\overline{BB}$ signals are up so that both of the inputs to the AND gate 43 are up whereby a T1 signal, which is the output of the AND gate 43, is high. This is when the counter 37 is at a count of zero as shown in the timing diagram of FIG. 3.

When the counter 37 has counted to one and it counts one each time that the oscillator 38 provides a positive going signal, the AA signal is high and the $\overline{BB}$ signal is high. These two signals are the two inputs to the AND gate 41 whereby its output, which is a T2 signal, is high. This is shown in the timing diagram of FIG. 3 wherein the T2 signal is high at the count of one. It should be understood that the T1 signal goes down when the $\overline{AA}$ signal goes down.

When the BB signal goes high at the count of two in the counter 37 whereby the $\overline{AA}$ signal goes high since the AA signal goes low, both of the inputs to the AND gate 44 are high. The AND gate 44 has its output, which is a T3 signal, go high at this time. As shown in the timing diagram of FIG. 3, the T3 signal goes high at the count of two, and the T2 signal goes low.

When the counter 37 reaches the count of three, both the AA and BB signals are up. Thus, the AND gate 42 has its output, which is a T4 signal, go high at this time as shown in the timing diagram of FIG. 3. When the T4 signal goes up, the T3 signal goes down because the $\overline{AA}$ signal goes down.

The T1 signal is supplied to a B input of a single shot 45 (see FIG. 2). One suitable example of the single shot 45 is a monostable multivibrator sold as model SN74121 by Texas Instruments.

The single shot 45 has its A1 and A2 inputs grounded. A resistor 46 connects pins 11 and 14 of the single shot 45 to each other, and a capacitor 47 connects pins 10 and 11 of the single shot 45 to each other. The time constant of the resistor 46 and the capacitor 47 determines the length of time that the single shot 45 has a high on its Q output.

The Q output of the single shot 45 provides the CRYSDR signal to the crystal driver circuit 35 (see FIG. 1) as more particularly shown and described in the aforesaid Meece et al application. The single shot 45 (see FIG. 2) has a $\overline{CRYSDR}$ signal supplied from its $\overline{Q}$ output. The CRYSDR signal is up for sixty percent of a cycle while it is down for forty percent of a cycle. Since the T1 signal goes positive every ten microseconds, the CRYSDR signal is at a frequency of 100 KHz.

As shown in the timing diagram of FIG. 3, each of the T1, T2, T3, and T4 signals is equal to one-fourth of a cycle of the CRYSDR signal. The T1 signal occurs during the first quarter of one of the CRYSDR signals with each of the T2, T3, and T4 signals occurring during the next succeeding quarter.

The T1, T2, T3, and T4 signals are supplied from the crystal drive and T time generator 36 (see FIG. 1) as inputs to a sync determination circuit 50. The sync determination circuit 50 also has the GAP signal from the analog gap detection circuit 31 supplied thereto as an input.

Figure 4:
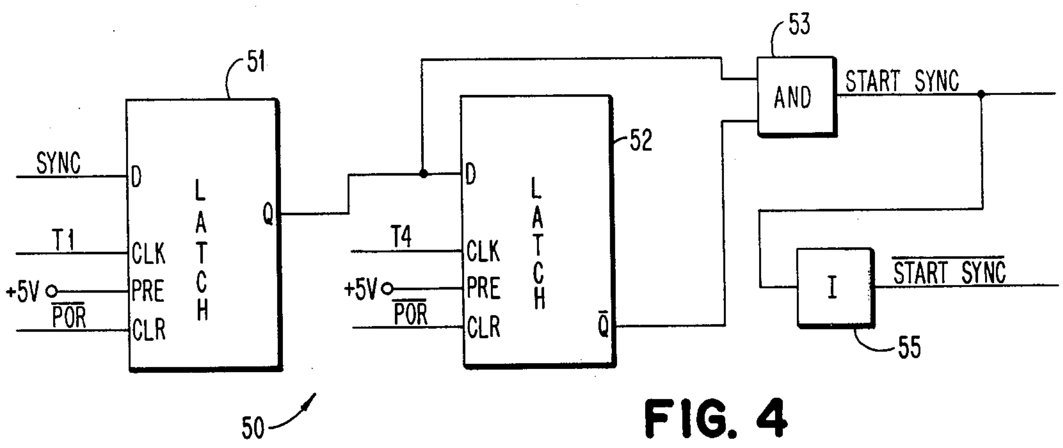
FIG. 4 is a schematic block diagram of a portion of a sync determination circuit.

As shown in FIG. 4, the sync determination circuit 50 includes a latch 51, which is preferably a dual D-type positive-edge-triggered flip-flop with preset and clear sold by Texas Instruments as model SN7474. The latch 51 has its D input receiving a SYNC signal, which goes high whenever it is desired to synchronize the charging of the droplets 20 with their formation. The SYNC signal must remain high for longer than two cycles of the CRYSDR signal and less than three cycles of the CRYSDR signal.

The latch 51 has its CLK input receive the T1 signal. Thus, when the T1 signal goes up after the SYNC signal has gone up, the latch 51 has its Q output go up.

The Q output of the latch 51 is connected to D input of a latch 52, which is the same as the latch 51. The Q output of the latch 51 also is supplied as one of the two inputs to an AND gate 53, which has its other input connected to Q output of the latch 52.

Each of the latches 51 and 52 has its PRE input connected to +5 volts and its CLR input receiving a $\overline{POR}$ signal. The $\overline{POR}$ signal is up except when the power is initially turned on.

Accordingly, when the Q output of the latch 51 goes up at the time that the T1 signal goes up, both of the inputs to the AND gate 53 are high. As a result, the AND gate 53 has its output, which is a START SYNC signal, go up.

When the T4 signal, which is supplied to CLK input of the latch 52, goes up after the Q output of the latch 51 has gone up, the latch 52 has its $\overline{Q}$ output go down. As a result, the START SYNC signal of the output of the AND gate 53 goes down because only one of the two inputs to the AND gate 53 is high. Therefore, as shown in the timing diagram of FIG. 5, the START SYNC signal goes up the first time that the T1 signal goes up after the SYNC signal has gone up and the START SYNC signal goes down the first time that the T4 signal goes up after the START SYNC signal has gone high.

The output of the AND gate 53 also is connected to an inverter 55, which supplies a $\overline{START\ SYNC}$ signal as its output. The $\overline{START\ SYNC}$ signal is the same magnitude as the START SYNC signal but inverse thereto.

The START SYNC signal is supplied to B input of a single shot 56 (see FIG. 6) of the sync determination circuit 50. The single shot 56 is preferably the same as the single shot 45.

The single shot 56 has its A1 and A2 inputs grounded. A resistor 57 connects pins 11 and 14 of the single shot 56 to each other, and a capacitor 58 connects pins 10 and 11 of the single shot 56 to each other. The time constant of the resistor 57 and the capacitor 58 determines the length of time that the single shot 56 has a positive ENABLE A signal on its Q output.

The ENABLE A signal, which goes positive when the START SYNC signal goes up, is supplied as one input to an AND gate 59, which has the GAP signal from the analog gap detection circuit 31 (see FIG. 1) as its other input. The ENABLE A signal stays up sufficiently for the two droplets 20 to pass the optical drop sensor 25 where the separation of the two droplets 20, if they have been charged, is sensed because of the presence of a gap therebetween.

Figure 7:
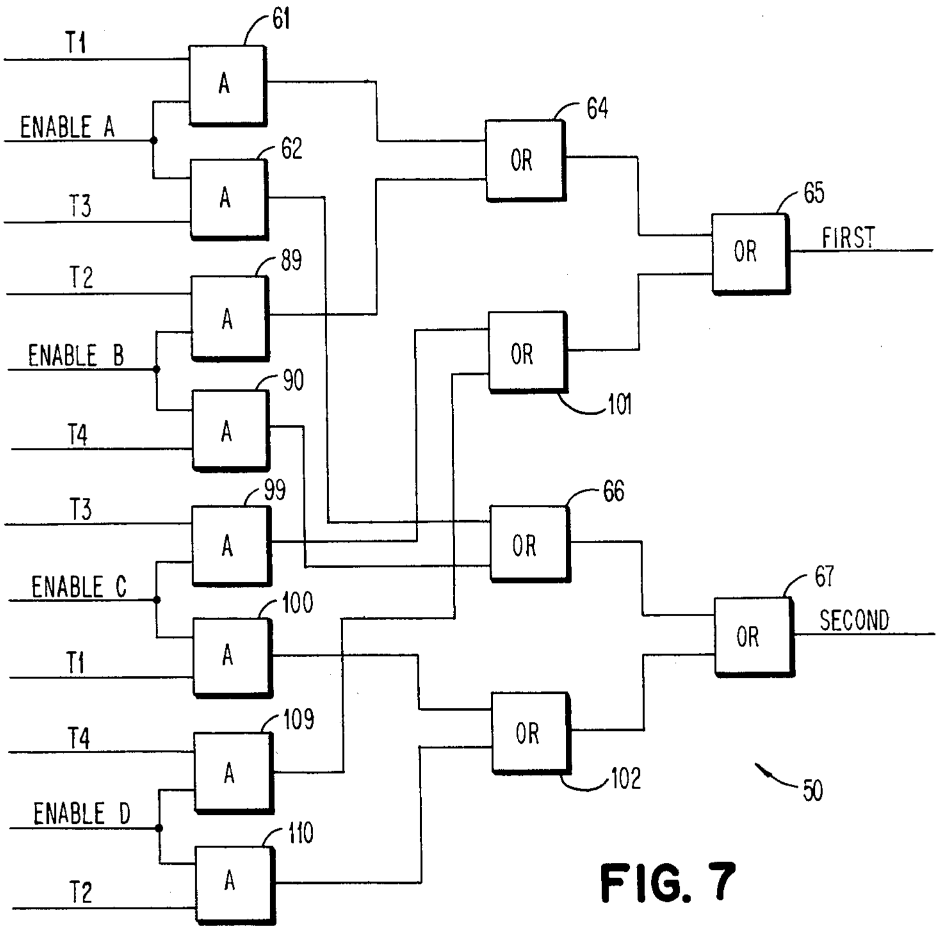
FIG. 7 is a schematic block diagram of a further portion of the sync determination circuit.

The ENABLE A signal also is supplied as one of the two inputs to each of AND gates 61 (see FIG. 7) and 62 of the sync determination circuit 50. The AND gate 61 has the T1 signal as its other input while the AND gate 62 has the T3 signal as its other input.

The output of the AND gate 61 is supplied as an input to an OR gate 62. The output of the OR gate 64 is supplied as an input to an OR gate 65, which produces a FIRST signal as its output.

The AND gate 62 has its output supplied as an input to an OR gate 66. The output of the OR gate 66 is supplied as an input to an OR gate 67, which supplies a SECOND signal as its output.

The FIRST signal from the OR gate 65 is supplied as an input to CLK input of each of latches 68 (see FIG. 8) and 69 of the sync determination circuit 50. Each of the latches 68 and 69 is preferably the same as the latch 51.

The SECOND signal from the output of the OR gate 67 (see FIG. 7) is supplied to CLK input of each of latches 71 (see FIG. 8) and 72 of the sync determination circuit 50. Each of the latches 71 and 72 is preferably the same as the latch 51.

Each of the latches 68, 69, 71, and 72 has its PRE input connected to +5 volts. Each of the latches 68, 69, 71, and 72 has its CLR signal receiving the POR signal, which is up except during the power on sequence.

The ENABLE A signal from the Q output of the single shot 56 (see FIG. 6) also is supplied to B input of a single shot 73 (see FIG. 8), which is preferably the same as the single shot 45, of the sync determination circuit 50. The single shot 73 has its A1 and A2 inputs grounded and its Q output (AP signal) connected as one input to an OR gate 74. The output of the OR gate 74 is supplied as an input to an OR gate 75.

The output of the OR gate 75 supplies a PUL signal as one input to an AND gate 75', which has the SECOND signal from the output of the OR gate 67 (see FIG. 7) as its other input. The AND gate 75' (see FIG. 8) has its output connected to CLK input of a latch 76, which is preferably the same as the latch 51.

A resistor 77 connects pins 11 and 14 of the single shot 73 to each other, and a capacitor 78 connects pins 10 and 11 of the single shot 73 to each other. The time constant of the resistor 77 and the capacitor 78 determines the length of time that the AP signal from the Q output of the single shot 73 stays high with the AP signal going up when the ENABLE A signal goes high as shown in the timing diagram of FIG. 9. The AP signal must go low prior to the $\overline{\text{FOUR}}$ signal from $\overline{\text{Q}}$ output of the latch 72 going low but must not go low until the SECOND signal goes up following the AP signal going high.

Therefore, with the latch 76 having +5 volts at its D and PRE inputs, the high at the D input of the latch 76 is transferred to its Q output, which is connected to D input of the latch 68, when the SECOND signal goes high after the AP signal goes up.

When the FIRST signal from the output of the OR gate 65 (see FIG. 7) goes up after the SECOND signal has gone up to cause the Q output of the latch 76 (see FIG. 8) to go up (This is when the T1 signal goes up following the T3 signal going up.), the latch 68 has its Q output go up. The Q output of the latch 68 produces a ONE signal as its output and supplies it to D input of the latch 71 and as one of the two inputs to an AND gate 79. The other input to the AND gate 79 is Q output of the latch 71.

At the time that the ONE signal at the Q output of the latch 68 goes high, the $\overline{\text{Q}}$ output of the latch 71 also is high. Therefore, at this time, the AND gate 79 supplies a high output as an input to an OR gate 80.

The output of the OR gate 80 is an input to an OR gate 81, which supplies a TABC signal as its output. Thus, when the AND gate 79 has its output go high, the TABC signal from the OR gate 81 goes high.

When the SECOND signal from the OR gate 67 (see FIG. 7) next goes high after the FIRST signal has gone high, the latch 71 (see FIG. 8) has the high at its D input transferred to its Q output whereby its $\overline{\text{Q}}$ output goes low. When this occurs, the output of the AND gate 79 goes low.

Figure 10:
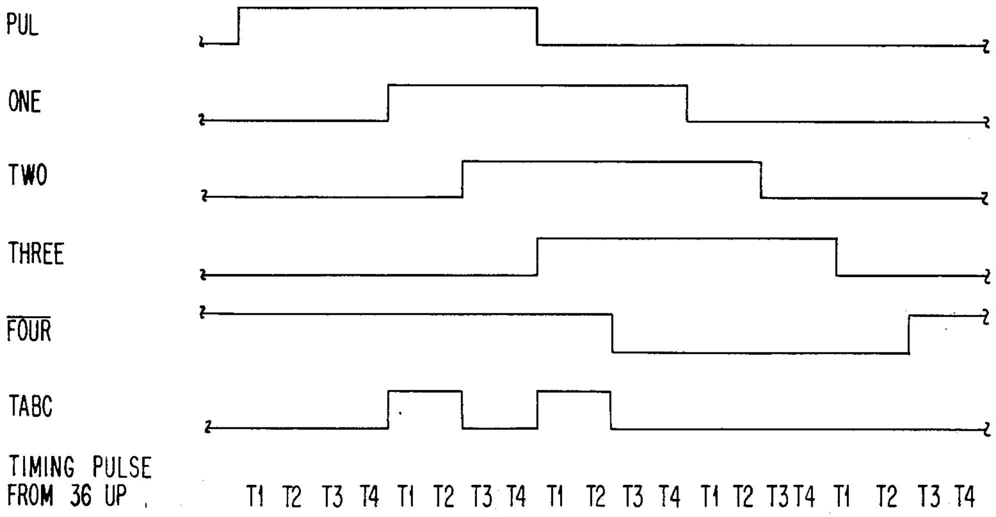
FIG. 10 is a timing diagram showing the relationship of signals produced by the circuit of FIG. 8.

As shown in the timing diagram of FIG. 10, the TABC signal stays high from the time that the ONE signal goes up until the TWO signal, which is at the Q output of the latch 71 (see FIG. 8), goes high. The TWO signal at the Q output of the latch 71 goes high when the T3 signal goes up. Thus, the TABC signal from the OR gate 81 is up only during the time that the adjacent T1 and T2 signals are being produced.

The Q output of the latch 71 is supplied to D input of the latch 69, which has its CLK input receiving the FIRST signal. Thus, when the next of the FIRST signals occurs after the SECOND signal which caused the TWO signal to go up at the time that the T3 signal went up, the latch 69 has its Q output go high. The Q output of the latch 69 produces a THREE signal, and this occurs the next time that the T1 pulse goes up after it has gone up to cause the ONE signal to go up as shown in the timing diagram of FIG. 10.

The Q output of the latch 69 (see FIG. 8) is not only connected to D input of the latch 72 but also as one of the two inputs to an AND gate 82. The other input to the AND gate 82 is a $\overline{\text{FOUR}}$ signal from $\overline{\text{Q}}$ output of the latch 72.

At the time that the THREE signal from the Q output of the latch 69 goes high, both of the inputs to the AND gate 82 are high. Therefore, the TABC signal from the output of the OR gate 81 again goes up. This is the next time that the T1 signal goes up as is shown in the timing diagram of FIG. 10.

When the SECOND signal from the output of the OR gate 67 (see FIG. 7) again goes up after the FIRST signal has gone up to cause the Q output of the latch 69 (see FIG. 8) to go high, the $\overline{\text{Q}}$ output of the latch 72 goes down. This results in the output of the AND gate 82 going low whereby the TABC signal from the output of the OR gate 81 goes low.

Since the SECOND signal is produced when the T3 signal goes up, the TABC signal goes down at the start of the T3 signal. Thus, the second of the TABC signals is up for the same time as the first of the TABC signals. This is for only the time that the adjacent T1 and T2 signals are high.

The $\overline{\text{FOUR}}$ signal from the $\overline{Q}$ output of the latch 72 is supplied as an input to not only the AND gate 82 but also to an AND gate 82', which has its output connected to CLR input of the latch 76. The other input to the AND gate 82' is the $\overline{\text{POR}}$ signal, which is up except when the power is initially turned on.

Therefore, when the $\overline{\text{FOUR}}$ signal goes down, the Q output of the latch 76 goes low. As a result, the ONE signal goes down the next time that the FIRST signal from the OR gate 65 (see FIG. 7) goes up. This is when the T1 signal again goes up.

When the ONE signal goes down, the D input of the latch 71 (see FIG. 8) goes low. This results in the TWO signal at the Q output of the latch 71 going low the next time that the SECOND signal from the OR gate 67 (see FIG. 7) goes up. This is when the next of the T3 signals starts up.

Since the Q output of the latch 71 (see FIG. 8) is connected to the D input of the latch 69, the D input of the latch 69 goes low at this time. When the FIRST signal from the OR gate 65 (see FIG. 7) next goes up, the low at the D input of the latch 69 (see FIG. 8) is transferred to the Q output of the latch 69 whereby the THREE signal goes down. This is when the next of the T1 signals goes up.

When the THREE signal goes down, the D input of the latch 72 is low. Therefore, when the next of the SECOND signals from the OR gate 67 (see FIG. 7) goes up, the $\overline{Q}$ output of the latch 72 (see FIG. 8) goes high. This is when the next of the T3 signals goes up. Therefore, as shown in the timing diagram of FIG. 10, the ONE, TWO, THREE, and $\overline{\text{FOUR}}$ signals have returned to their original states.

As shown in FIG. 10, the PUL signal from the output of the OR gate 75 goes down prior to the $\overline{\text{FOUR}}$ signal going up. Because of the single shot 73 (see FIG. 8), no further positive going pulse occurs at the CLK input of the latch 76 as long as the ENABLE A signal is being supplied since it is a constant high to the B input of the single shot 73 and the single shot 73 is triggered by a positive going signal. As previously mentioned, the single shot 56 (see FIG. 6) causes the ENABLE A signal to be high for a sufficient period of time for the two droplets 20 (see FIG. 1) to pass the optical sensor 25 prior to the ENABLE A signal going down.

If the GAP signal from the analog gap detection circuit 31 goes high during the time that the ENABLE A signal is high, this indicates that the two droplets 20 have been charged during the time that the adjacent T1 and T2 signals were high. If this occurs, the AND gate 59 (see FIG. 6) has a high output, which is supplied to CLK input of a latch 83. The latch 83, which is the same as the latch 51, has each of its D and PRE inputs connected to +5 volts with its CLR input receiving the $\overline{\text{START SYNC}}$ signal.

Accordingly, the high at the CLK input of the latch 83 from the output of the AND gate 59 causes an A signal at Q output of the latch 83 to go high and an $\overline{A}$ signal at $\overline{Q}$ output of the latch 83 to go low. The A and $\overline{A}$ signals remain in this state until the $\overline{\text{START SYNC}}$ signal goes low at the start of another synchronization sequence.

When the ENABLE A signal goes down, the latch 56 has its $\overline{Q}$ output, which is connected to B input of a single shot 85, go up. The single shot 85, which is preferably the same as the single shot 45, has its A1 and A2 inputs grounded.

A resistor 86 connects pins 11 and 14 of the single shot 85 to each other, and a capacitor 87 connects the pins 10 and 11 of the single shot 85 to each other. The time constant of the resistor 86 and the capacitor 87 determines the length of time that an ENABLE B signal at Q output of the single shot 85 is high.

The ENABLE B signal at the Q output of the single shot 85 goes up when the ENABLE A signal goes down because this is when the $\overline{Q}$ output of the single shot 56 goes up. The ENABLE B signal stays up sufficiently for the two droplets 20 (see FIG. 1) to pass the optical drop sensor 25 where the separation of the two droplets 20, if they have been charged, is sensed because of the presence of a gap therebetween.

Figure 6:
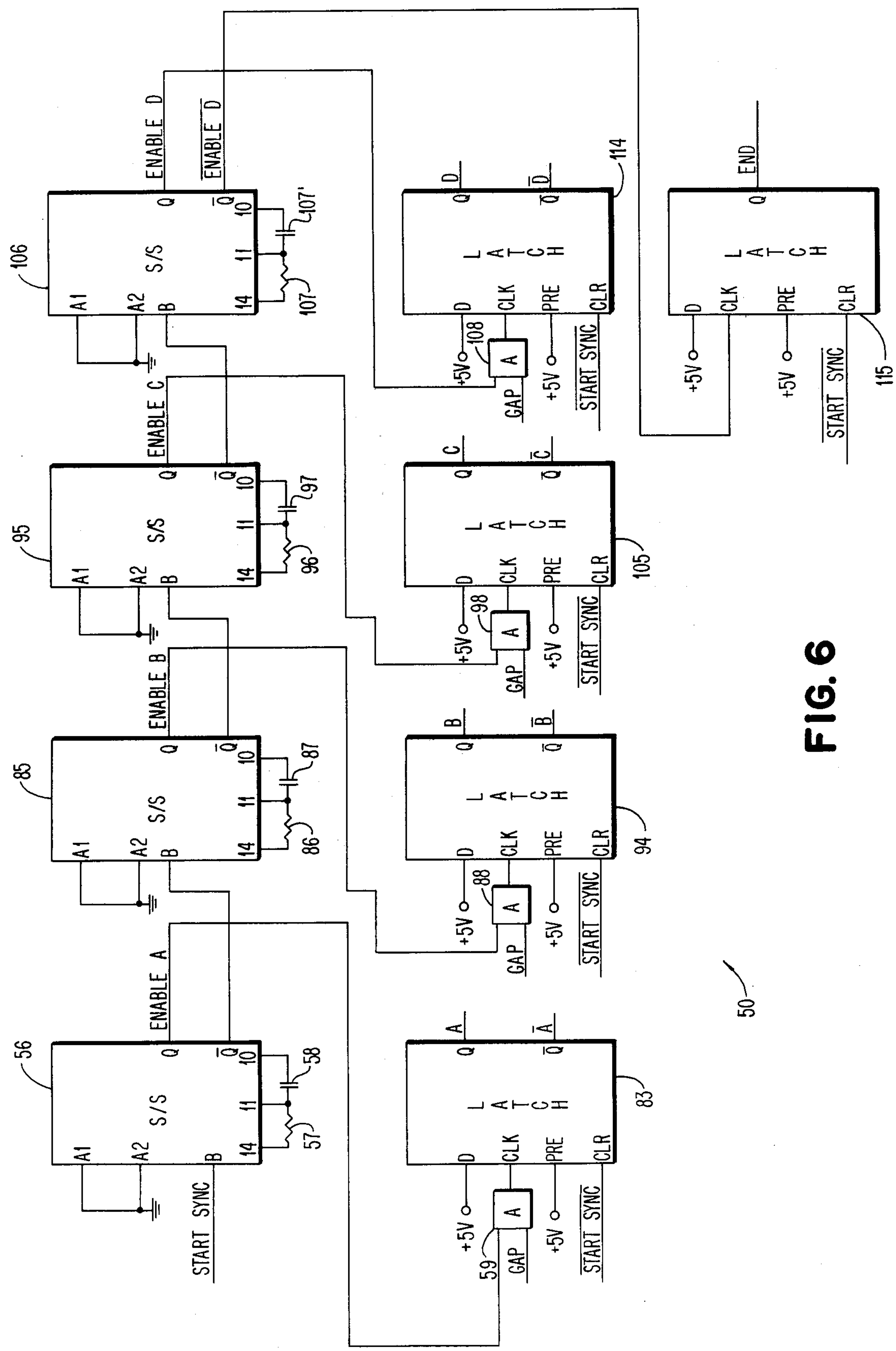
FIG. 6 is a schematic block diagram of another portion of the sync determination circuit.

The ENABLE B signal is supplied as one input to an AND gate 88 (see FIG. 6). The GAP signal from the analog gap detection circuit 31 (see FIG. 1) is the other input to the AND gate 88 (see FIG. 6).

The ENABLE B signal also is supplied as one of two inputs to each of AND gates 89 and 90 (see FIG. 7) of the sync determination circuit 50. The AND gate 89 has the T2 signal from the AND gate 41 (see FIG. 2) as its other input while the AND gate 90 (see FIG. 7) has the T4 signal from the AND gate 42 (see FIG. 2) as its other input.

The output of the AND gate 89 (see FIG. 7) is supplied as an input to the OR gate 64. As previously mentioned, the OR gate 64, which receives the output of the AND gate 61 as an input, has its output supplied as an input to the OR gate 65, which produces the FIRST signal as its output.

The AND gate 90 has its output supplied as an input to the OR gate 66. As previously mentioned, the OR gate 66, which receives its other input from the output of the AND gate 62, has its output supplied to the OR gate 67, which supplies the SECOND signal as its output.

The ENABLE B signal from the Q output of the single shot 85 (see FIG. 6) also is supplied to B input of a single shot 91 (see FIG. 8), which is preferably the same as the single shot 45, of the sync determination circuit 50. The single shot 91 has its A1 and A2 inputs grounded and its Q output (BP signal) connected as the other input to the OR gate 74. As previously mentioned, the OR gate 74, which receives the AP signal as its other input, has its output supplied as an input to the OR gate 75, which supplies the PUL signal from its output as one input to the AND gate 75'.

A resistor 92 connects pins 11 and 14 of the single shot 91 to each other, and a capacitor 93 connects pins 10 and 11 of the single shot 91 to each other. The time constant of the resistor 92 and the capacitor 93 determines the length of time that the BP signal from the Q output of the single shot 91 stays high with the BP signal going up when the ENABLE B signal goes high. The BP signal must go low prior to the $\overline{\text{FOUR}}$ signal from the $\overline{Q}$ output of the latch 72 going low but must not go low until the SECOND signal goes up following the BP signal going high.

Therefore, the high at the D input of the latch 76 is transferred to the Q output, which is connected to the D input of the latch 68, when the SECOND signal goes high after the BP signal goes up.

When the FIRST signal from the output of the OR gate 65 (see FIG. 7) goes up after the SECOND signal has gone up to cause the Q output of the latch 76 (see FIG. 8) to go up (This is when the T2 signal goes up following the T4 signal going up.), the ONE signal from the Q output of the latch 68 goes high. This causes the AND gate 79 to have a high as its output since the $\overline{Q}$ output of the latch 71 is up whereby the TABC signal from the OR gate 81 goes high.

When the SECOND signal from the output of the OR gate 67 (see FIG. 7) next goes high, the $\overline{Q}$ output of the latch 71 (see FIG. 8) goes low to cause the output of the AND gate 79 to go low. This occurs at the start of one of the T4 signals.

Thus, the TABC signal stays high from the time that the ONE signal goes up (This is when the T2 signal goes high.) until the TWO signal from the Q output of the latch 71 goes high (This is when the T4 signal goes high.). Thus, the TABC signal from the OR gate 81 is up only during the time that the adjacent T2 and T3 signals are being produced when the ENABLE B signal is up.

The latch 69 has its Q output produce a high THREE signal the next time that the T2 signal goes up after it has previously gone up to cause the ONE signal to go up. When the T2 signal goes up, the FIRST signal from the OR gate 65 (see FIG. 7) goes high.

When the THREE signal from the Q output of the latch 69 (see FIG. 8) goes up, both of the inputs to the AND gate 82 are high. Thus, the TABC signal from the output of the OR gate 81 again goes up.

When the SECOND signal from the output of the OR gate 67 (see FIG. 7) goes up (This is when the T4 signal goes high.) after the FIRST signal has gone up to cause the Q output of the latch 69 to go high, the $\overline{\text{FOUR}}$ signal from the $\overline{Q}$ output of the latch 72 goes down. This results in the output of the AND gate 82 going low whereby the TABC signal from the OR gate 81 goes low.

Thus, the second of the TABC signals is up for the same time period as the first of the TABC signals. This is for only the time that the adjacent T2 and T3 signals are high.

When the $\overline{\text{FOUR}}$ signal from the $\overline{Q}$ output of the latch 72 goes down, the Q output of the latch 76 goes low because the CLR input of the latch 76 goes low. Therefore, the ONE signal from the Q output of the latch 68 goes down the next time that the FIRST signal (This is produced by the T2 signal going high.) from the output of the OR gate 65 (see FIG. 7) goes up.

When the ONE signal goes down, the D input of the latch 71 (see FIG. 8) goes low whereby the TWO signal at the Q output of the latch 71 goes low the next time that the SECOND signal (This is produced by the T4 signal going up.) from the output of the OR gate 67 (see FIG. 7) goes up. With the Q output of the latch 71 (see FIG. 8) connected to the D input of the latch 69, the D input of the latch 69 goes low at this time. Accordingly, when the FIRST signal from the output of the OR gate 65 (see FIG. 7) next goes up (This is when the T2 signal goes up.), the low at the D input of the latch 69 (see FIG. 8) is transferred to the Q output of the latch 69 whereby the THREE signal goes down.

When the THREE signal goes down, the D input of the latch 72 goes low. Therefore, when the next of the SECOND signals from the output of the OR gate 67 (see FIG. 7) goes up (This is when the T4 signal goes high.), the $\overline{Q}$ output of the latch 72 (see FIG. 8) goes high whereby the $\overline{\text{FOUR}}$ signal goes high.

As previously mentioned, the ENABLE B signal remains up sufficiently for the two droplets 20 (see FIG. 1) to pass the optical sensor 25, which can optically sense whether the gap has been produced between the droplets 20. This will occur only if the droplets 20 were charged by the charge electrode voltage being applied to the charge electrode 19 during the time that the T2 and T3 signals are up.

If the GAP signal from the analog gap detection circuit 31 goes high during the time that the ENABLE B signal is high, this indicates that the two droplets 20 have been charged during the time that the adjacent T2 and T3 signals were high. If this occurs, the AND gate 88 (see FIG. 6) has a high output, which is supplied to CLK input of a latch 94, which is the same as the latch 51. The latch 94 has each of its D and PRE inputs connected to +5 volts with its CLR input receiving the $\overline{\text{START SYNC}}$ signal.

Accordingly, the high at the CLK input of the latch 94 from the output of the AND gate 88 causes a B signal at Q output of the latch 94 to go high and a $\overline{B}$ signal at $\overline{Q}$ output of the latch 94 to go low. The B and $\overline{B}$ signals remain in this state until the $\overline{\text{START SYNC}}$ signal goes low at the start of another synchronization sequence.

When the ENABLE B signal goes down, the latch 85 has its Q output, which is connected to B input of a single shot 95, go up. The single shot 95, which is preferably the same as the single shot 45, has its A1 and A2 inputs grounded. A resistor 96 connects pins 11 and 14 of the single shot 95 to each other, and a capacitor 97 connects pins 10 and 11 of the single shot 95 to each other. The time constant of the resistor 96 and the capacitor 97 determines the length of time that an ENABLE C signal at Q output of the single shot 95 is high.

The ENABLE C signal at the Q output of the single shot 95 goes up when the ENABLE B signal goes down because this is when the $\overline{Q}$ output of the single shot 85 goes up. The ENABLE C signal stays up sufficiently for the two droplets 20 (see FIG. 1) to pass the optical drop sensor 25 where the separation of the two droplets 20, if they have been charged, is sensed because of the presence of a gap therebetween.

The ENABLE C signal is supplied as one input to an AND gate 98 (see FIG. 6). The GAP signal from the analog gap detection circuit 31 (see FIG. 1) is the other input to the AND gate 98 (see FIG. 6).

The ENABLE C signal also is supplied as one of two inputs to each of AND gates 99 (see FIG. 7) and 100 of the sync determination circuit 50. The AND gate 99 has the T3 signal from the AND gate 44 (see FIG. 2) as its other input while the AND gate 100 (see FIG. 7) has the T1 signal from the AND gate 43 (see FIG. 2) as its other input.

The output of the AND gate 99 (see FIG. 7) is supplied as an input to an OR gate 101. The OR gate 101 has its output supplied as an input to the OR gate 65, which produces the FIRST signal as its output.

The AND gate 100 has its output supplied as an input to an OR gate 102. The OR gate 102 has its output supplied as an input to the OR gate 67, which supplies the SECOND signal as its output.

The ENABLE C signal from the Q output of the single shot 95 (see FIG. 6) also is supplied to B input of a single shot 103 (see FIG. 8), which is preferably the same as the single shot 45, of the sync determination circuit 50. The single shot 103 has its A1 and A2 inputs grounded and its Q output (CP signal) connected as one input to an OR gate 104. The OR gate 104 has its output supplied as an input to the OR gate 75, which supplies the PUL signal from its output as one input to the AND gate 75'.

A resistor 104A connects pins 11 and 14 of the single shot 103 to each other, and a capacitor 104B connects pins 10 and 11 of the single shot 103 to each other. The time constant of the resistor 104A and the capacitor 104B determines the length of time that the CP signal from the Q output of the single shot 103 stays high with the CP signal going up when the ENABLE C signal goes high. The CP signal must go low prior to the $\overline{\text{FOUR}}$ signal from the $\overline{Q}$ output of the latch 72 going low but must not go low until the SECOND signal goes up following the CP signal going high.

Therefore, the high at the D input of the latch 76 is transferred to the Q output, which is connected to the D input of the latch 68, when the SECOND signal goes high after the CP signal goes up.

When the FIRST signal from the output of the OR gate 65 (see FIG. 7) goes up after the SECOND signal has gone up to cause the Q output of the latch 76 (see FIG. 8) to go up (This is when the T3 signal goes up following the T1 signal going up because of the supply of the T3 signal to the AND gate 99 and the T1 signal to the AND gate 100.), the ONE signal from the Q output of the latch 68 goes high. This causes the AND gate 79 to have a high at its output since the $\overline{Q}$ output of the latch 71 is up whereby the TABC signal from the OR gate 81 goes high.

When the SECOND signal from the output of the OR gate 67 (see FIG. 7) next goes high, the $\overline{Q}$ output of the latch 71 (see FIG. 8) goes low to cause the output of the AND gate 79 to go low. This occurs at the start of one of the T1 signals.

Thus, the TABC signal stays high from the time that the ONE signal goes up (This is when the T3 signal goes high.) until the TWO signal from the Q output of the latch 71 goes high (This is when the T1 signal goes high.). Therefore, the TABC signal from the OR gate 81 is up only during the time that the adjacent T3 and T4 signals are being produced when the ENABLE C signal is up.

The latch 69 has its Q output produce a high THREE signal the next time that the T3 signal goes up after it has previously gone up to cause the ONE signal to go up. When the T3 signal goes up, the FIRST signal from the OR gate 65 (see FIG. 7) goes high.

When the THREE signal from the Q output of the latch 69 (see FIG. 8) goes up, both of the inputs to the AND gate 82 are high. Thus, the TABC signal from the output of the OR gate 81 again goes up.

When the SECOND signal from the output of the OR gate 67 (see FIG. 7) again goes up (This is when the T1 signal goes high.) after the FIRST signal has gone up to cause the Q output of the latch 69 (see FIG. 8) to go high, the $\overline{\text{FOUR}}$ signal from the $\overline{Q}$ output of the latch 72 goes down. This results in the output of the AND gate 82 going low whereby the TABC signal from the OR gate 81 goes low.

Thus, the second of the TABC signals is up for the same time period as the first of the TABC signals. This is for only the time that the adjacent T3 and T4 signals are high.

When the $\overline{\text{FOUR}}$ signal from the $\overline{Q}$ output of the latch 72 goes down, the Q output of the latch 76 goes low because the CLR input of the latch 76 goes low. Therefore, the ONE signal from the Q output of the latch 68 goes down the next time that the FIRST signal (This is produced by the T3 signal going high.) from the output of the OR gate 65 (see FIG. 7) goes up.

When the ONE signal goes down, the D input of the latch 71 (see FIG. 8) goes low whereby the TWO signal at the Q output of the latch 71 goes low the next time that the SECOND signal (This is produced by the T1 signal going up.) from the output of the OR gate 67 (see FIG. 7) goes up. With the Q output of the latch 71 (see FIG. 8) connected to the D input of the latch 69, the D input of the latch 69 goes low at this time. Accordingly, when the FIRST signal from the output of the OR gate 65 (see FIG. 7) next goes up (This is when the T3 signal goes up.), the low at the D input of the latch 69 (see FIG. 8) is transferred to the Q output of the latch 69 whereby the THREE signal goes down.

When the THREE signal goes down, the D input of the latch 72 goes low. Therefore, when the next of the SECOND signals from the output of the OR gate 67 (see FIG. 7) goes up (This is when the T1 signal goes high.), the $\overline{Q}$ output of the latch 72 (see FIG. 8) goes high whereby the $\overline{\text{FOUR}}$ signal goes high.

As previously mentioned, the ENABLE C signal remains up sufficiently for the two droplets 20 (see FIG. 1) to pass the optical sensor 25, which can optically sense whether the gap has been produced between the droplets 20. This will occur only if the droplets 20 were charged by the charge electrode voltage being applied to the charge electrode 19 during the time that the T3 and T4 signals are up.

If the GAP signal from the analog gap detection circuit 31 goes high during the time that the ENABLE C signal is high, this indicates that the two droplets 20 have been charged during the time that the adjacent T3 and T4 signals were high. If this occurs, the AND gate 98 (see FIG. 6) has a high output, which is supplied to CLK input of a latch 105, which is the same as the latch 51. The latch 105 has each of its D and PRE inputs connected to +5 volts with its CLR input receiving the $\overline{\text{START SYNC}}$ signal.

Accordingly, the high at the CLK input of the latch 105 from the output of the AND gate 98 causes a C signal at Q output of the latch 105 to go high and a $\overline{C}$ signal at $\overline{Q}$ output of the latch 105 to go low. The C and $\overline{C}$ signals remain in this state until the $\overline{\text{START SYNC}}$ signal goes low at the start of another synchronization sequence.

When the ENABLE C signal goes down, the latch 95 has its $\overline{Q}$ output, which is connected to B input of a single shot 106, go up. The single shot 106, which is preferably the same as the single shot 45, has its A1 and A2 inputs grounded. A resistor 107 connects pins 11 and 14 of the single shot 106 to each other, and a capacitor 107' connects pins 10 and 11 of the single shot 106 to each other. The time constant of the resistor 107 and the capacitor 107' determines the length of time that an ENABLE D signal at Q output of the single shot 106 is high.

The ENABLE D signal at the Q output of the single shot 106 goes up when the ENABLE C signal goes down because this is when the $\overline{Q}$ output of the single shot 95 goes up. The ENABLE D signal stays up sufficiently for the two droplets 20 (see FIG. 1) to pass the optical drop sensor 25 where the separation of the two droplets 20, if they have been charged, is sensed because of the presence of a gap therebetween.

The ENABLE D signal is supplied as one input to an AND gate 108 (see FIG. 6). The GAP signal from the analog gap detection circuit 31 (see FIG. 1) is the other input to the AND gate 108 (see FIG. 6).

The ENABLE D signal also is supplied as one of two inputs to each of AND gates 109 (see FIG. 7) and 110. The AND gate 109 has the T4 signal from the AND gate 42 (see FIG. 2) as its other input while the AND gate 110 (see FIG. 7) has the T2 signal from the AND gate 41 (see FIG. 2) as its other input.

The output of the AND gate 109 (see FIG. 7) is supplied as an input to the OR gate 101. As previously mentioned, the OR gate 101, which also receives the output of the AND gate 99 as an input, has its output supplied as an input to the OR gate 65, which produces the FIRST signal as its output.

The AND gate 110 has its output supplied as an input to the OR gate 102. As previously mentioned, the OR gate 102, which receives its other input from the output of the AND gate 100, has its output supplied as an input to the OR gate 67, which supplies the SECOND signal as its output.

The ENABLE D signal from the Q output of the single shot 106 (see FIG. 6) also is supplied to B input of a single shot 111 (see FIG. 8), which is preferably the same as the single shot 45, of the sync determination circuit 50. The single shot 111 has its A1 and A2 inputs grounded and its Q output (DP signal) connected as an input to the OR gate 104. As previously mentioned, the OR gate 104, which receives the CP signal as its other input, has its output supplied as an input to the OR gate 75, which supplies the PUL signal from its output as one input to the AND gate 75'.

A resistor 112 connects pins 11 and 14 of the single shot 111 to each other, and a capacitor 113 connects pins 10 and 11 of the single shot 111 to each other. The time constant of the resistor 112 and the capacitor 113 determines the length of time that the DP signal from the Q output of the single shot 111 stays high with the DP signal going up when the ENABLE D signal goes high. The DP signal must go low prior to the $\overline{\text{FOUR}}$ signal from the $\overline{Q}$ output of the latch 72 going low but must not go low until the SECOND signal goes up following the DP signal going high.

Therefore, the high at the D input of the latch 76 is transferred to the Q output, which is connected to the D input of the latch 68, when the SECOND signal goes high after the DP signal goes up.

When the FIRST signal from the output of the OR gate 65 (see FIG. 7) goes up after the SECOND signal has gone up to cause the Q output of the latch 76 (see FIG. 8) to go up (This is when the T4 signal goes up following the T2 signal going up because of the supply of the T4 signal to the AND gate 109 and the T2 signal to the AND gate 110.), the ONE signal from the Q output of the latch 68 goes high. This causes the AND gate 79 to have a high at its output since the $\overline{Q}$ output of the latch 71 is up whereby the TABC signal from the OR gate 81 goes high.

When the SECOND signal from the output of the OR gate 67 (see FIG. 7) next goes high, the $\overline{Q}$ output of the latch 71 (see FIG. 8) goes low to cause the output of the AND gate 79 to go low. This occurs at the start of one of the T2 signals.

Thus, the TABC signal stays high from the time that the ONE signal goes up (This is when the T4 signal goes high.) until the TWO signal goes high (This is when the T2 signal goes high.). Therefore, the TABC signal from the OR gate 81 is up only during the time that the adjacent T4 and T1 signals are being produced when the ENABLE D signal is up.

The latch 69 has its Q output produce a high THREE signal the next time that the T4 signal goes up after it has previously gone up to cause the ONE signal to go up. When the T4 signal goes up, the FIRST signal from the OR gate 65 (see FIG. 7) goes high.

When the THREE signal from the Q output of the latch 69 (see FIG. 8) goes up, both of the inputs to the AND gate 82 are high. Thus, the TABC signal from the output of the OR gate 81 again goes up.

When the SECOND signal from the output of the OR gate 67 (see FIG. 7) again goes up (This is when the T2 signal goes high.) after the FIRST signal has gone up to cause the Q output of the latch 69 (see FIG. 8) to go high, the $\overline{\text{FOUR}}$ signal from the $\overline{Q}$ output of the latch 72 goes down. This results in the output of the AND gate 82 going low whereby the TABC signal from the OR gate 81 goes low.

Thus, the second of the TABC signals is up for the same time period as the first of the TABC signals. This is for only the time that the adjacent T4 and T1 signals are high.

When the $\overline{\text{FOUR}}$ signal from the $\overline{Q}$ output of the latch 72 goes down, the Q output of the latch 76 goes low because the CLR input of the latch 76 goes low. Therefore, the ONE signal from the Q output of the latch 68 goes down the next time that the FIRST signal (This is produced by the T4 signal going high.) from the output of the OR gate 65 (see FIG. 7) goes up.

When the ONE signal goes down, the D input of the latch 71 (see FIG. 8) goes low whereby the TWO signal at the Q output of the latch 71 goes low the next time that the SECOND signal (This is produced by the T2 signal going up.) from the output of the OR gate 67 (see FIG. 7) goes up. With the Q output of the latch 71 (see FIG. 8) connected to the D input of the latch 69, the D input of the latch 69 goes low at this time. Accordingly, when the FIRST signal from the output of the OR gate 65 (see FIG. 7) next goes up (This is when the T4 signal goes up.), the low at the D input of the latch 69 (see FIG. 8) is transferred to the Q output of the latch 69 whereby the THREE signal goes down.

When the THREE signal goes down, the D input of the latch 72 goes low. Therefore, when the next of the SECOND signals from the output of the OR gate 67 (see FIG. 7) goes up (This is when the T2 signal goes high.), the $\overline{Q}$ output of the latch 72 (see FIG. 8) goes high whereby the $\overline{\text{FOUR}}$ signal goes high.

As previously mentioned, the ENABLE D signal remains up sufficiently for the two droplets 20 (see FIG. 1) to pass the optical sensor 25, which can optically sense whether the gap has been produced between the droplets 20. This will occur only if the droplets 20 were charged by the charge electrode voltage being applied to the charge electrode 19 during the time that the T4 and T1 signals are up.

If the GAP signal from the analog gap detection circuit 31 goes high during the time that the ENABLE D signal is high, this indicates that the two droplets 20 have been charged during the time that the adjacent T4 and T1 signals were high. If this occurs, the AND gate 108 (see FIG. 6) has a high output, which is supplied to CLK input of a latch 114, which is the same as the latch 51. The latch 114 has each of its D and PRE inputs connected to +5 volts with its CLR input receiving the $\overline{\text{START SYNC}}$ signal.

Accordingly, the high at the CLK input of the latch 114 from the output of the AND gate 108 causes a D signal at Q output of the latch 114 to go high and a $\overline{\text{D}}$ signal at $\overline{Q}$ output of the latch 114 to go low. The D and $\overline{D}$ signals remain in this state until the $\overline{\text{START SYNC}}$ signal goes low at the start of another synchronization sequence.

When the Q output of the single shot 106 ceases to supply a high ENABLE D signal, the $\overline{\text{ENABLE D}}$ signal at the Q output of the single shot 106 goes up. This is supplied to CLK input of a latch 115, which is the same as the latch 51. The latch 115 has each of its D and PRE inputs connected to +5 volts with its CLR input receiving the $\overline{\text{START SYNC}}$ signal.

Figure 8:
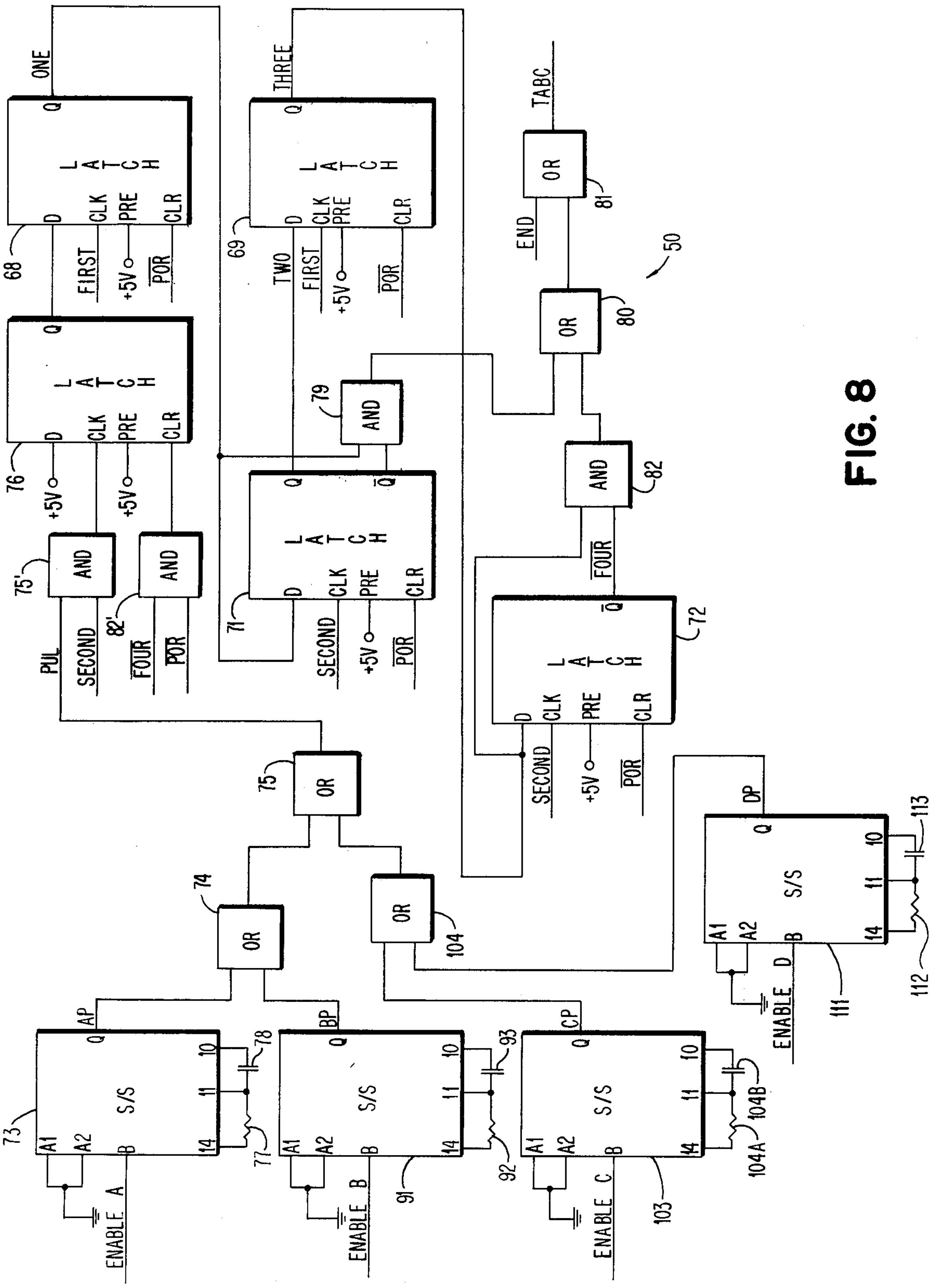
FIG. 8 is a schematic block diagram of still another portion of the sync determination circuit.
Figure 9:
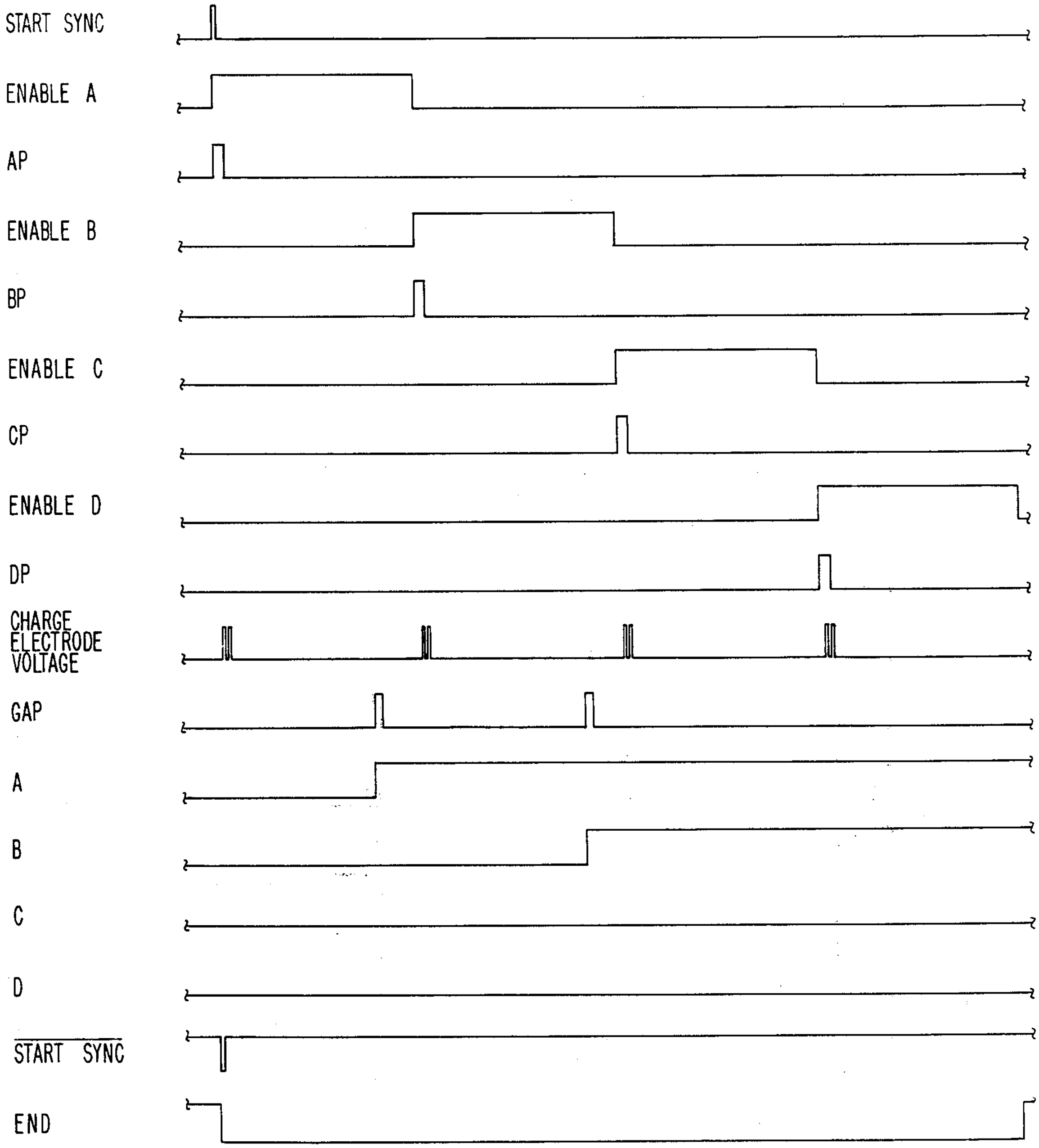
FIG. 9 is a timing diagram showing the relationship of various signals produced by portions of the sync determination circuit.

When the $\overline{\text{ENABLE D}}$ signal goes high at the conclusion of the time that the ENABLE D signal is high, the latch 115 has its Q output go high so that an END signal thereon goes high as shown in the timing diagram of FIG. 9. The END signal is supplied as a second input to the OR gate 81 (see FIG. 8) so that it causes the TABC signal to be high when there is no determination of the synchronization of the charging of the droplets 20 (see FIG. 1) with their formation.

The TABC signal is supplied from the OR gate 81 (see FIG. 8) as one input to each of AND gates 116–119 (see FIG. 11) of a print pattern control circuit 120. The AND gates 116, 117, 118, and 119 have the outputs of inverters 121, 122, 123, and 124, respectively, as their other inputs.

The print pattern control circuit 120 includes a print pattern shift register 125. One suitable example of the print pattern shift register 125 is an 8-bit parallel-out serial shift register sold as model SN74164 by Texas Instruments.

The print pattern shift register 125 has its pin 10 connected to the input of the inverter 121, its pin 11 connected to the input of the inverter 122, its pin 12 connected to the input of the inverter 123, and its pin 13 connected to the input of the inverter 124. The outputs at pins 10, 11, 12, and 13 of the print pattern shift register 125 function to determine when one of the droplets 20 (see FIG. 1) strikes the recording surface 22 to print. That is, printing by one of the droplets 20 occurs only when the print pattern shift register 125 (see FIG. 11) has a logical one as the output on its pin 10. When this occurs, the output of the inverter 121 is low so that the output of the AND gate 116 is low.

The outputs of the AND gates 116–119 are connected to a select generator circuit 129 (see FIG. 1) with the select generator circuit 129 being connected to a charge electrode driver circuit 130. The charge electrode driver circuit 130 is connected to the charge electrode 19 and does not charge the droplet 20 to a sufficient magnitude to strike the gutter 24 when the droplet 20 is to print. By having the output of the AND gate 116 (see FIG. 11) at a logical zero, the droplet 20 (see FIG. 1) is not charged to a sufficient extent to cause the droplet 20 to strike the gutter 24.

The print pattern shift register 125 (see FIG. 11) has its pin 14 connected to +5 volts and its pin 7 grounded. The print pattern shift register 125 has its CLR input receiving the END signal from the latch 115 (see FIG. 6).

The print pattern shift register 125 (see FIG. 11) has each of its output pins 10, 11, 12, and 13 go to a logical zero when the END signal to the CLR input of the print pattern shift register 125 goes low. This is when the $\overline{\text{START SYNC}}$ signal goes low. This, of course, occurs when the START SYNC signal goes high to begin the synchronization sequence to determine if the charging of the droplets 20 (see FIG. 1) is synchronized with their formation.

As shown in FIG. 9, the negative going $\overline{\text{START SYNC}}$ signal at the CLR input of the latch 115 (see FIG. 6) causes the END signal to go down. Therefore, all of the outputs from the inverters 121–124 (see FIG. 11) are high during the time that the synchronization sequence is occurring since the END signal is down until the ENABLE D signal goes down. This enables the state of the TABC signal to determine whether the outputs of the AND gate 116–119 are low or high since each is the same as the TABC signal.

Likewise, when there is no synchronization sequence so that the END signal is high, the TABC signal is always high because the END signal is an input to the OR gate 81 (see FIG. 8). Thus, in other than a synchronization sequence in which the synchronization of the charging of the droplets 20 (see FIG. 1) with their formation is determined, the output of each of the AND gates 116–119 (see FIG. 11) reflects the output from one of pins 10–13 of the print pattern shift register 125 but are of the opposite logic level to that at pins 10, 11, 12, and 13 of the print pattern shift register 125.

The data for determining whether one of the droplets 20 (see FIG. 1) is used to print is determined by an input signal, CDATAIN, on a line 131 (see FIG. 11) to each of pins 1 and 2 of the print pattern shift register 125. This is supplied from any device controlling the print pattern such as a computer, for example.

The print pattern shift register 125 has its CLK input receiving a clock signal, CCHZSW, from an OR gate 132 (see FIG. 12) of the print pattern control circuit 120. The CCHZSW signal is produced from the output of one of AND gates 133, 134, 135, and 136.

The outputs of the AND gates 133 and 134 are connected as inputs to an OR gate 137, which has its output connected as one of the two inputs to the OR gate 132. The outputs of the AND gates 135 and 136 are connected as inputs to an OR gate 138, which has its output connected as the other input to the OR gate 132.

The AND gate 133 has a USET1 signal, the END signal, and the T1 signal as its inputs. The AND gate 134 has a USET2 signal, the END signal, and the T2 signal as its inputs. The AND gate 135 has a USET3 signal, the END signal, and the T3 signal as its inputs. The AND gate 136 has a USET4 signal, the END signal, and the T4 signal as its inputs.

As previously mentioned, the END signal from the Q output of the latch 115 (see FIG. 6) is always up except during the synchronizing sequence when the synchronization of charging of the droplets 20 (see FIG. 1) with their formation is being determined. The T1, T2, T3, and T4 signals are sequentially produced, as previously mentioned, by the use of the counter 37 (see FIG. 2), the oscillator 38, the inverters 39 and 40, and the AND gates 41–44.

Therefore, if only one of the USET1, USET2, USET3, and USET4 signals is up, then only one of the AND gate 133–136 (see FIG. 12) will produce a high during each of the CRYSDR signal cycles with the length of time that the CCHZSW signal is up during a cycle being determined by the time that the T1, T2, T3, or T4 signal is up.

In order for the charge to be properly applied to each of the droplets 20 (see FIG. 1), it is necessary that the start of the charge voltage to the charge electrode 19 occur so that the break off of the droplet 20 from the stream 18 occurs in the third quarter of the time period during which the charge voltage is applied to the charge electrode 19. Thus, if the synchronization sequence has determined that the droplet 20 is breaking off when the T3 signal is being applied, then it is necessary for the charge voltage supplied to the charge electrode 19 to begin with the start of the T1 signal since this is two quarters earlier. Therefore, the USET1 signal must be high.

Figure 13A:
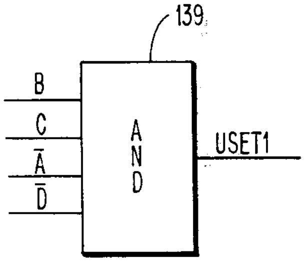
FIGS. 13A–13D are schematic block diagrams of still further portions of the sync determination circuit.

The USET1 signal is supplied from an AND gate 139 (see FIG. 13A). The AND gate 139 has the B signal from the Q output of the latch 94 (see FIG. 6), the C signal from Q output of the latch 105, the $\overline{A}$ signal from the $\overline{Q}$ output of the latch 83, and the $\overline{D}$ signal from the $\overline{Q}$ of the latch 114 as its inputs.

The B and C signals are up only when the break off of the droplet 20 (see FIG. 1) from the stream 18 occurs when the T3 signal is being applied to the charge electrode 19 during the synchronization sequence. That is, the B signal from the Q output of the latch 94 (see FIG. 6) is up only when the GAP signal is up with the charge electrode 19 (see FIG. 1) having voltage applied thereto during the time that the adjacent T2 and T3 signals are up (This is when the ENABLE B signal is up.). Similarly, the C signal goes up only if the GAP signal goes up during the time that two of the droplets 20 have been charged by the charge electrode 19 receiving a voltage when the T3 and T4 signals are up (This is when the ENABLE C signal is up.).

Only the T3 signal is up during both of the times when the ENABLE B and ENABLE C signals are high. Therefore, this shows that the break off of the droplet 20 from the stream 18 occurred during the time that the T3 signal was up (This is the third quarter of the CRYSDR signal cycle.).

Accordingly, to obtain charging of the charge electrode 19 so that break off of the droplet 20 from the stream 18 occurs during the third quarter of the cycle time that the charge voltage is applied to the charge electrode 19, it is necessary for the input signal to the pattern shift register 125 (see FIG. 11) to be clocked from the input line 131 to pin 10 of the print pattern shift register 125 at the time that the T1 signal goes up. This insures that the charge voltage to the charge electrode 19 (see FIG. 1) is in the third quarter of the time of its application thereto when the droplet 20 breaks off from the stream 18 since the break off is occurring when the T3 signal is high.

Figure 13B:
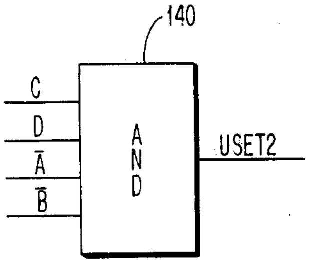
Figure 12:
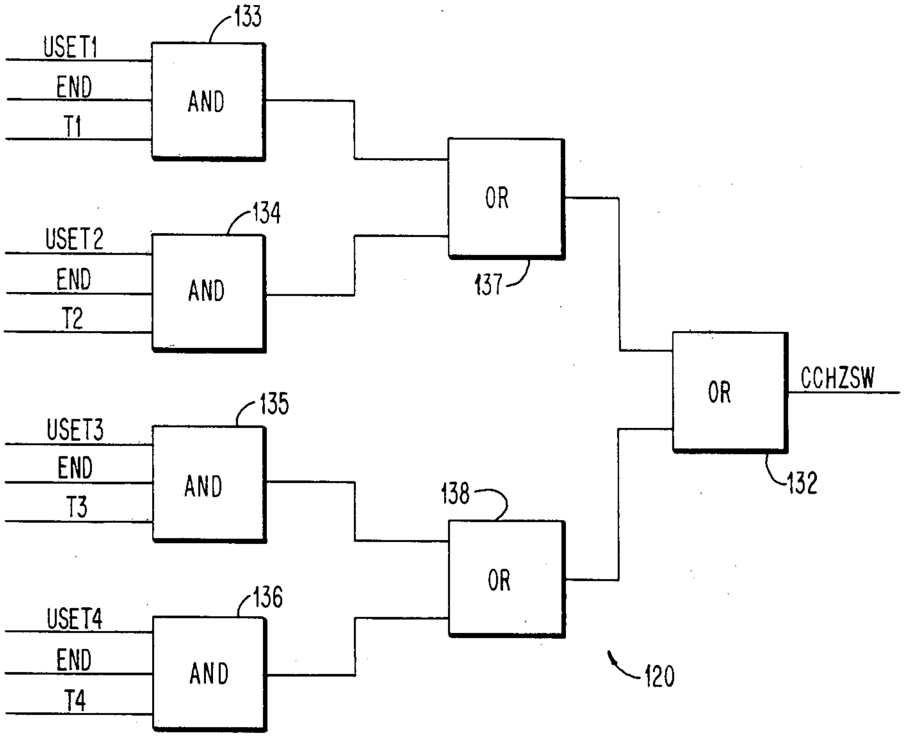
FIG. 12 is a schematic block diagram of another portion of the print pattern control circuit.

An AND gate 140 (see FIG. 13B) supplies the USET2 signal as its output to the AND gate 134 (see FIG. 12). The AND gate 140 (see FIG. 13B) has the $\overline{A}$, $\overline{B}$, C, and D signals as its inputs. The C signal from the Q output of the latch 105 (see FIG. 6) is high only when the break off of the droplets 20 (see FIG. 1) from the stream 18 occurs during the time that the adjacent T3 and T4 signals are high in the synchronization sequence. Similarly, the D signal from the Q output of the latch 114 (see FIG. 6) is high only when the break off in the synchronization sequence occurs when the adjacent T4 and T1 signals are high.

Therefore, since the T4 signal is the only common signal to these two signals, then it is necessary to supply the CCHZSW signal to the CLK input of the print pattern shift register 125 (see FIG. 11) when the T2 signal starts. Thus, each time that the T2 signal goes high, the CCHZSW signal goes high to provide a clock pulse to the CLK input of the print pattern shift register 125 to shift the signal on the line 131 to pin 10 of the print pattern shift register 125 and to shift each of the signals on pins 10, 11, and 12 to pins 11, 12, and 13, respectively.

Figure 13C:
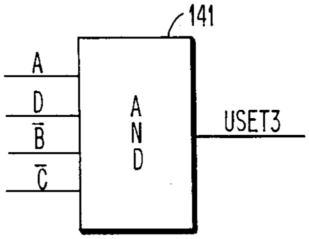

An AND gate 141 (see FIG. 13C) supplies the USET3 signal as its output to the AND gate 135 (see FIG. 12). The AND gate 141 (see FIG. 13C) has the A, $\overline{B}$, $\overline{C}$, and D signals as its inputs. Each of the A and D signals is high only when break off occurs when the T1 signal is high during the synchronization sequence. Therefore, it is necessary to clock the signals through the print pattern shift register 125 (see FIG. 11) in accordance with the T3 signal, which is supplied to the AND gate 135 (see FIG. 12).

Figure 13D:
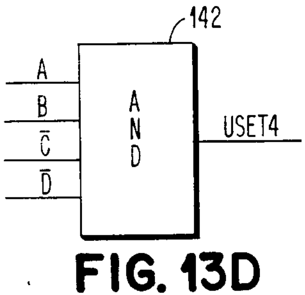

An AND gate 142 (see FIG. 13D) supplies the USET4 signal as its output to the AND gate 136 (see FIG. 12). The AND gate 142 (see FIG. 13D) has the A, B, $\overline{C}$, and $\overline{D}$ signals as its inputs. Each of the A and B signals is up during the synchronization sequence only when the break off has been determined to occur when the T2 signal is up. Thus, it is necessary to clock the pulses through the print pattern shift register 125 (see FIG. 11) one-half a cycle early. Accordingly, the T4 signal, which is supplied to the AND gate 136 (see FIG. 12), is used as the clock signal, CCHZSW, when the USET4 signal is high.

When one of the droplets 20 (see FIG. 1) is charged by the charge electrode 19 to a sufficient magnitude so that it does not print, the charge coupled between the droplets 20 formed thereafter is such that varying amounts of voltage must be applied to the next three of the droplets 20 to compensate for this induced charge even though each of these droplets 20 is going to be printed.

Figure 14:
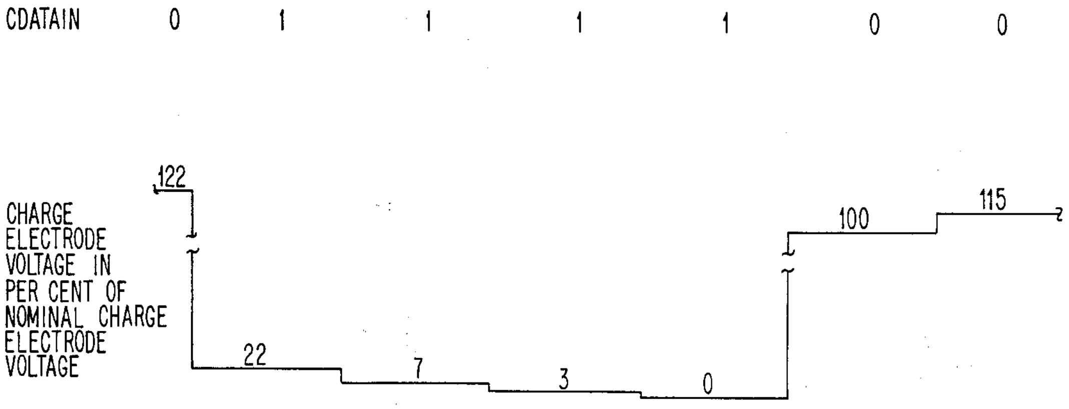
FIG. 14 is a diagram showing the relationship of the charge electrode voltage and input signals for selected droplets to be printed and not printed.

As shown in FIG. 14, the charge electrode 19 (see FIG. 1) receives a voltage of 122% of nominal voltage, for example, when the droplet 20 is not to be used for printing and the three prior droplets 20 have not been printed. It should be understood that nominal voltage is the voltage to the charge electrode 19 to not print one of the droplets 20 when the three prior droplets 20 have been printed. The next four droplets 20 are to be printed as indicated by logical ones (the CDATAIN signal) being supplied over the input line 131 (see FIG. 11) to the print pattern shift register 125.

The voltage to the charge electrode 19 (see FIG. 1) will not drop to zero until each of pins 10, 11, 12, and 13 of the print pattern shift register 125 (see FIG. 11) is at zero. This is because the AND gate 116 supplies the logical signal to determine whether the droplet 20 is to print. The output of the AND gate 117 is employed to compensate for the induced charge producing by charging of the droplet 20 (see FIG. 1) which is adjacent to the droplet 20 in the charge electrode 19 being charged or not charged. The output of the AND gate 118 (see FIG. 11) is utilized to correct for the induced charge produced by charging of the droplet 20 (see FIG. 1) which occurred two droplets prior to the droplet 20 that is to be charged or not charged. The output of the AND gate 119 (see FIG. 11) is employed to correct for the induced charge produced by charging of the droplet 20 (see FIG. 1) which occurred three droplets prior to the droplet 20 that is to be charged or not charged.

Therefore, even though the outputs of the AND gates 117 (see FIG. 11), 118, and 119 are producing logical ones as their outputs at the time that the output of the AND gate 116 is producing a logical zero, for example, the voltages produced by the outputs of the AND gates 117-119 do not cause any deflection of the droplet 20 (see FIG. 1), which is to be printed. Instead, these voltages compensate for the charge produced on the droplet 20, which is to be printed, by the inductions of the three prior droplets 20 since these three prior droplets 20 were deemed to have been charged so as to not print. If any of these three prior droplets 20 was used to print, then the AND gate 117 (see FIG. 11), 118, or 119 for the specific droplet 20 (see FIG. 1) would not be producing a signal to cause a compensation voltage to be supplied to the charge electrode 19.

Figure 15:
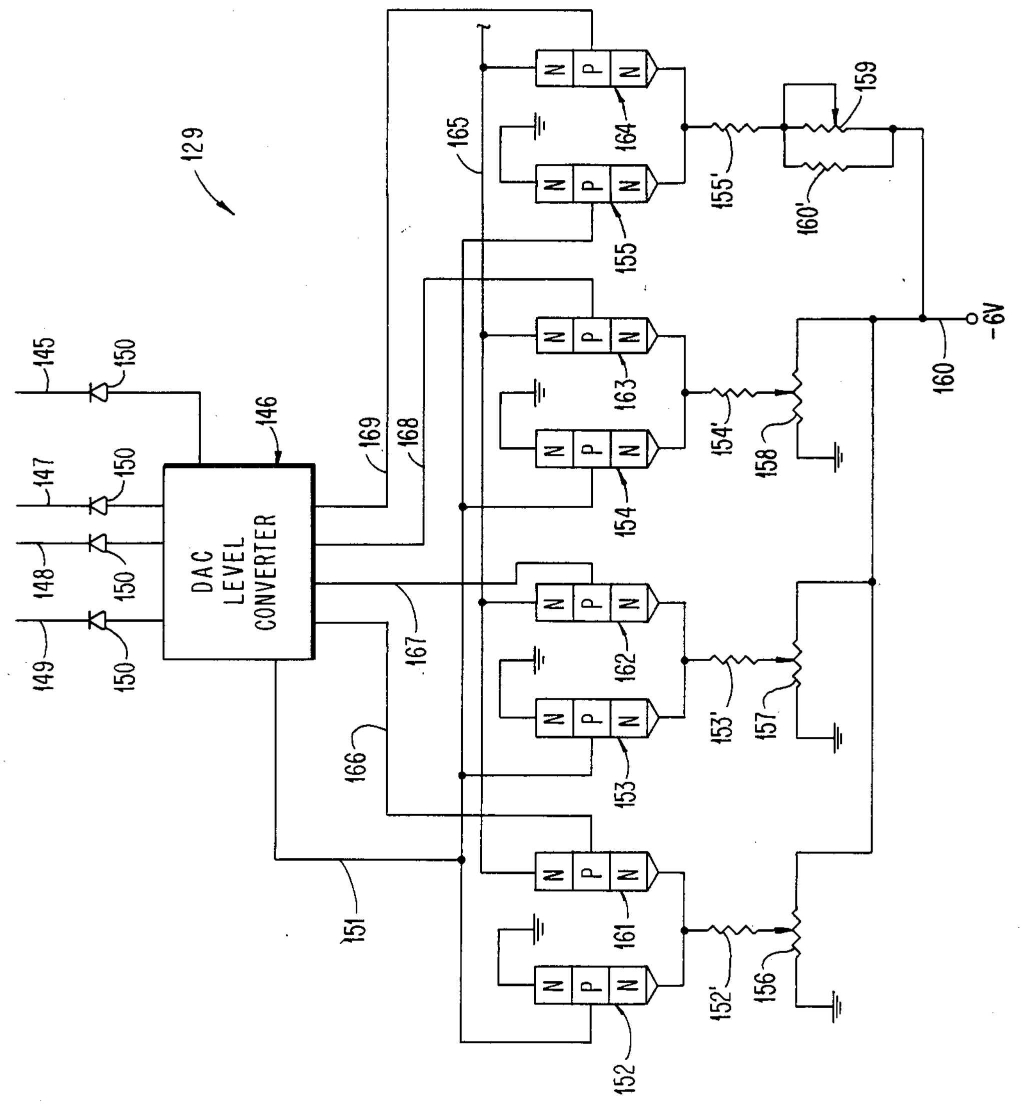
FIG. 15 is a schematic block diagram of a select generator circuit.

As previously mentioned, the output of each of the AND gates 116–119 (see FIG. 11) is supplied to the selector generator circuit 129 (see FIG. 15). The output of the AND gate 116 (see FIG. 11) is connected by a line 145 to a digital to analog converter (DAC) level converter 146 (see FIG. 15). Similarly, the AND gates 117 (see FIG. 11), 118, and 119, respectively, are connected by lines 147, 148, and 149, respectively, to the DAC level converter 146 (see FIG. 15). Each of the lines 145, 147, 148, and 149 has a diode 150 therein to prevent current flow to the DAC level converter 146 when the output of the connected AND gate is high.

The DAC level converter 147 supplies a reference voltage of −0.7 volt over a line 151 to the base of each of NPN transistors 152, 153, 154, and 155. Each of the transistors 152–155 has its collector grounded. The emitter of each of the transistors 152, 153, 154, and 155 is connected through resistors 152′, 153′, 154′, and 155′, respectively, to potentiometers 156, 157, 158, and 159, respectively.

Each of the potentiometers 156, 157, and 158 has one end grounded and its other end connected to a line 160 having a constant voltage of −6 volts thereon. The potentiometer 159 has one end connected to the line 160 and its other end connected to one end of the resistor 155′. The potentiometer 159 has a resistor 160′ in parallel therewith.

Each of the transistors 152, 153, 154, and 155, respectively, has its emitter connected to an emitter of an NPN transistor 161, 162, 163, and 164, respectively. The collectors of the transistors 161–164 are connected to a line 165, which is connected to the charge electrode driver circuit 130 (see FIG. 1). The bases of the transistors 161 (see FIG. 15), 162, 163, and 164, respectively, are connected by lines 166, 167, 168, and 169, respectively, to the DAC level converter 146.

When the output of the AND gate 119 (see FIG. 11) is high, there is compensation for the induced charge created by the third prior droplet 20 (see FIG. 1) because the third prior droplet 20 was charged. As a result, the DAC level converter 146 (see FIG. 15) supplies a higher voltage on the line 166 to the base of the transistor 161 than the reference voltage on the line 151 to the base of the transistor 152. This causes the transistor 161 to conduct to pull current from the charge electrode driver circuit 130 (see FIG. 1) to increase the output of the voltage of the charge electrode driver circuit 130 to the charge electrode 19.

When the output of the AND gate 119 (see FIG. 11) is low, the voltage to the charge electrode 19 (see FIG. 1) does not include an induction compensation for the third prior droplet 20 since it was not charged. Therefore, the DAC level converter 146 (see FIG. 15) supplies a lower voltage on the line 166 to the base of the transistor 161 than the reference voltage on the line 151 to the base of the transistor 152. This causes the transistor 161 to turn off to decrease the current flowing through the line 165 from the charge electrode driver circuit 130 (see FIG. 1) to decrease the output of the voltage from the charge electrode driver circuit 130 to the charge electrode 19.

Figure 11:
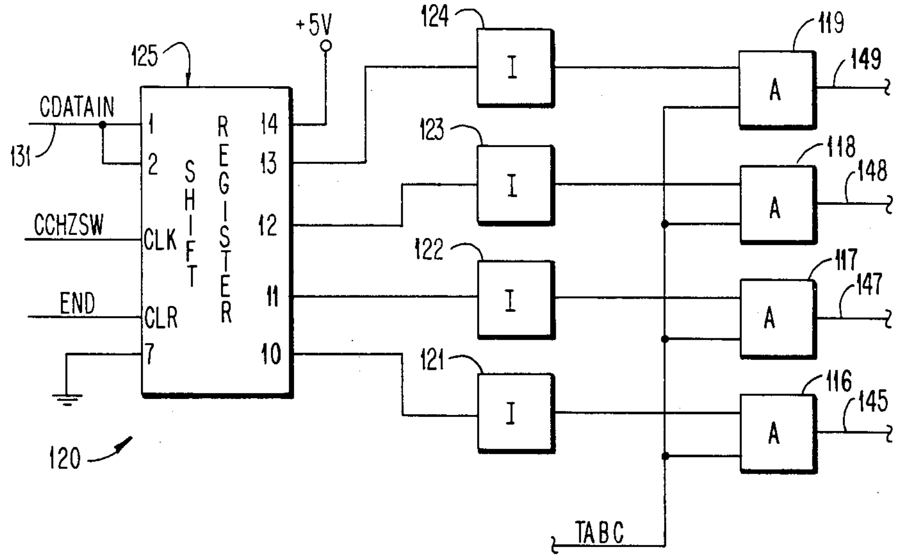
FIG. 11 is a schematic block diagram of a portion of a print pattern control circuit.

A similar arrangement exists between the transistors 153 (see FIG. 15) and 162 in accordance with the output of the AND gate 118 (see FIG. 11), between the transistors 154 (see FIG. 15) and 163 in accordance with the output of the AND gate 117 (see FIG. 11), and between the transistors 155 (see FIG. 15) and 164 in accordance with the output of the AND gate 116 (see FIG. 11). The output of the AND gate 118 determines whether there is an induction compensation for the second prior droplet 20 (see FIG. 1), the output of the AND gate 117 (see FIG. 11) determines whether there is an induced charged compensation for the first prior droplet 20 (see FIG. 1), and the output of the AND gate 116 (see FIG. 11) determines whether the droplet 20 (see FIG. 1) is to be printed.

Figure 16:
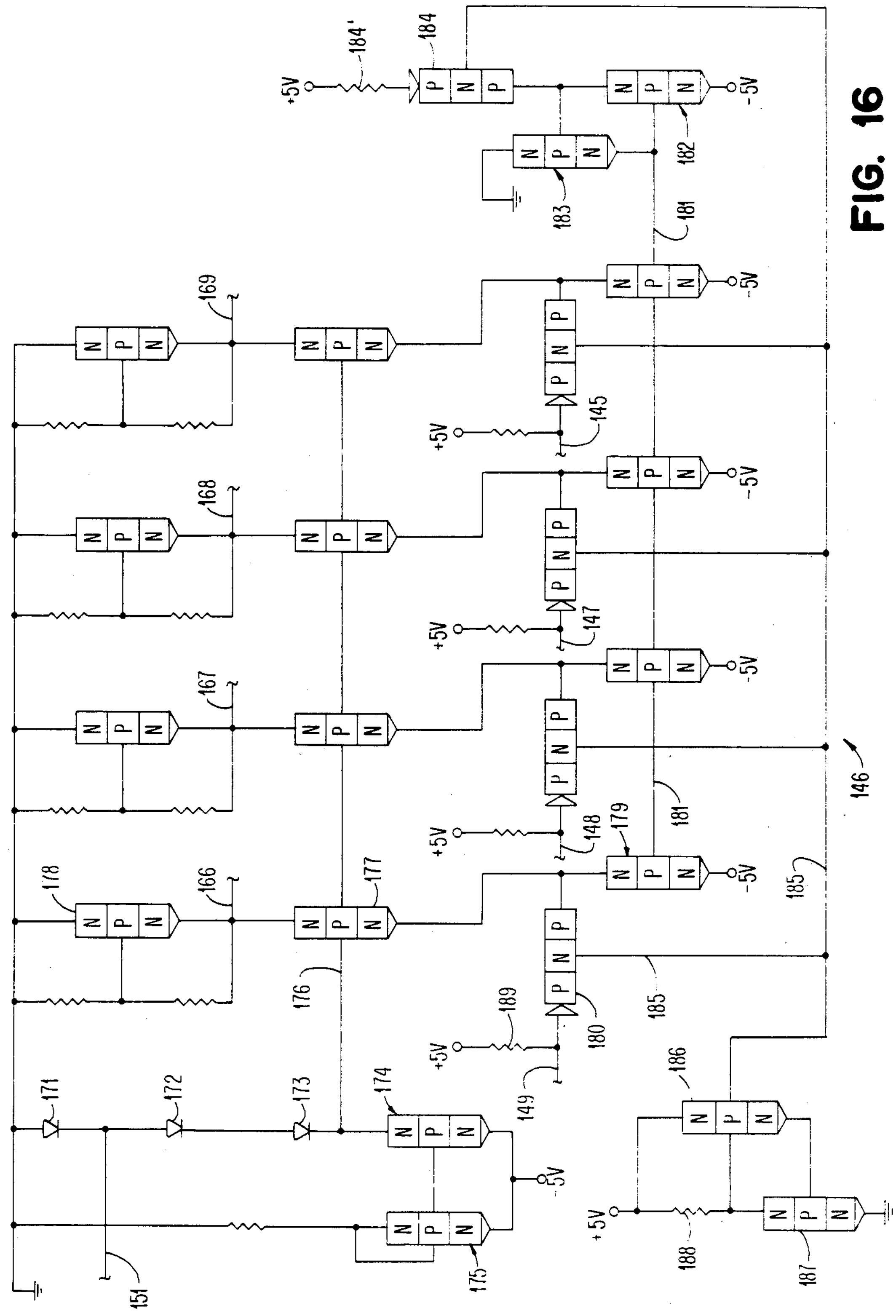
FIG. 16 is a schematic block diagram of a DAC level converter of the select generator circuit of FIG. 15.

Referring to FIG. 16, the DAC level converter 146 includes three series connected diodes 171, 172, and 173 with the diode 171 having its anode grounded and the diode 173 having its cathode connected to the collector of an NPN transistor 174. The transistor 174 has its emitter connected to −5 volts and its base connected to the base of an NPN transistor 175, which has its base and collector connected so that it functions as a diode. As a result of a constant current being supplied from the transistor 174, the line 151, which is connected between the diodes 171 and 172, provides the reference voltage of −0.7 volt.

A line 176 is connected to the collector of the transistor 174 to supply a reference voltage of −2.1 volts to the base of an NPN transistor 177. The transistor 177 has its collector connected to the line 166 and to the emitter of an NPN transistor 178, which has its collector grounded. Thus, the voltage at the collector of the transistor 177 determines whether the line 166 supplies a voltage greater or lesser than the reference voltage of −0.7 volt supplied over the line 151.

The emitter of the transistor 177 is connected to the collectors of an NPN transistor 179 and a PNP transistor 180. The base of the transistor 179 has a constant voltage supplied thereto over a line 181 so that the collector of the transistor 179 has a constant current supplied thereto since its emitter is connected to −5 volts.

The line 181 is connected to the base of an NPN transistor 182 and the emitter of an NPN transistor 183. The base of the transistor 183 is connected to the collector of the transistor 182 and the collector of a PNP transistor 184, which has its emitter connected to +5 volts through a resistor 184′. The transistors 182–184 function to insure that the line 181 has a constant voltage thereon.

The base of the transistor 180 has a constant voltage of 1.4 volts supplied thereto over a line 185 from the base of an NPN transistor 186, which has its emitter connected to the base of an NPN transistor 187. The collector of the NPN transistor 187, which has its emitter grounded, is connected to the base of the transistor 186. The collector of the transistor 186 is connected to a constant voltage source of +5 volts, which also is supplied through a resistor 188 to the collector of the transistor 187 and the base of the transistor 186.

The emitter of the transistor 180 is connected to the line 149 to receive the output of the AND gate 119 (see FIG. 11) through the diode 150 (see FIG. 15). The emitter of the transistor 180 (see FIG. 16) also is connected to +5 volts through a resistor 189.

When the transistor 180 is turned on because of the voltage on the line 149 going high, current flows from the transistor 180 to the collector of the transistor 179 from the source of +5 volts through the resistor 189. The constant voltage on the base of the transistor 180 from the line 185 insures that the transistor 180 turns on when the AND gate 119 (see FIG. 11) supplies a high to the line 149.

With the current being supplied to the transistor 179 (see FIG. 16) from the transistor 180, the transistor 177 does not supply currents to the transistor 179. Thus, the emitter of the transistor 178 is high so that the line 166 produces a higher voltage at the base of the transistor 161 (see FIG. 15) than the reference voltage supplied over the line 151 to the base of the transistor 152. As a result, the transistor 161 conducts to draw current from the charge electrode driver circuit 130 (see FIG. 1) whereby the output voltage of the charge electrode driver circuit 130 increases.

Whenever the AND gate 119 (see FIG. 11) is supplying a low on the line 149 so that there is to be no induced charge compensation for the third prior droplet 20 (see FIG. 1), the transistor 180 (see FIG. 16) is turned off. As a result, the constant collector current to the transistor 179 must be supplied through the transistor 177. When the transistor 177 is supplying current to the transistor 179, the emitter of the transistor 178 drops so that the voltage on the line 166 decreases below that of the reference voltage on the line 151. As a result, the transistor 161 (see FIG. 15) is turned off to reduce the current drawn over the line 165 from the charge electrode driver circuit 130 (see FIG. 1) whereby the output voltage from the charge electrode driver circuit 130 to the charge electrode 19 goes down.

A similar arrangement exists for each of the other of the lines 167–169 (see FIG. 15) and the corresponding input lines 148, 147, and 145, respectively. Thus, these will not be described in detail.

Figure 17:
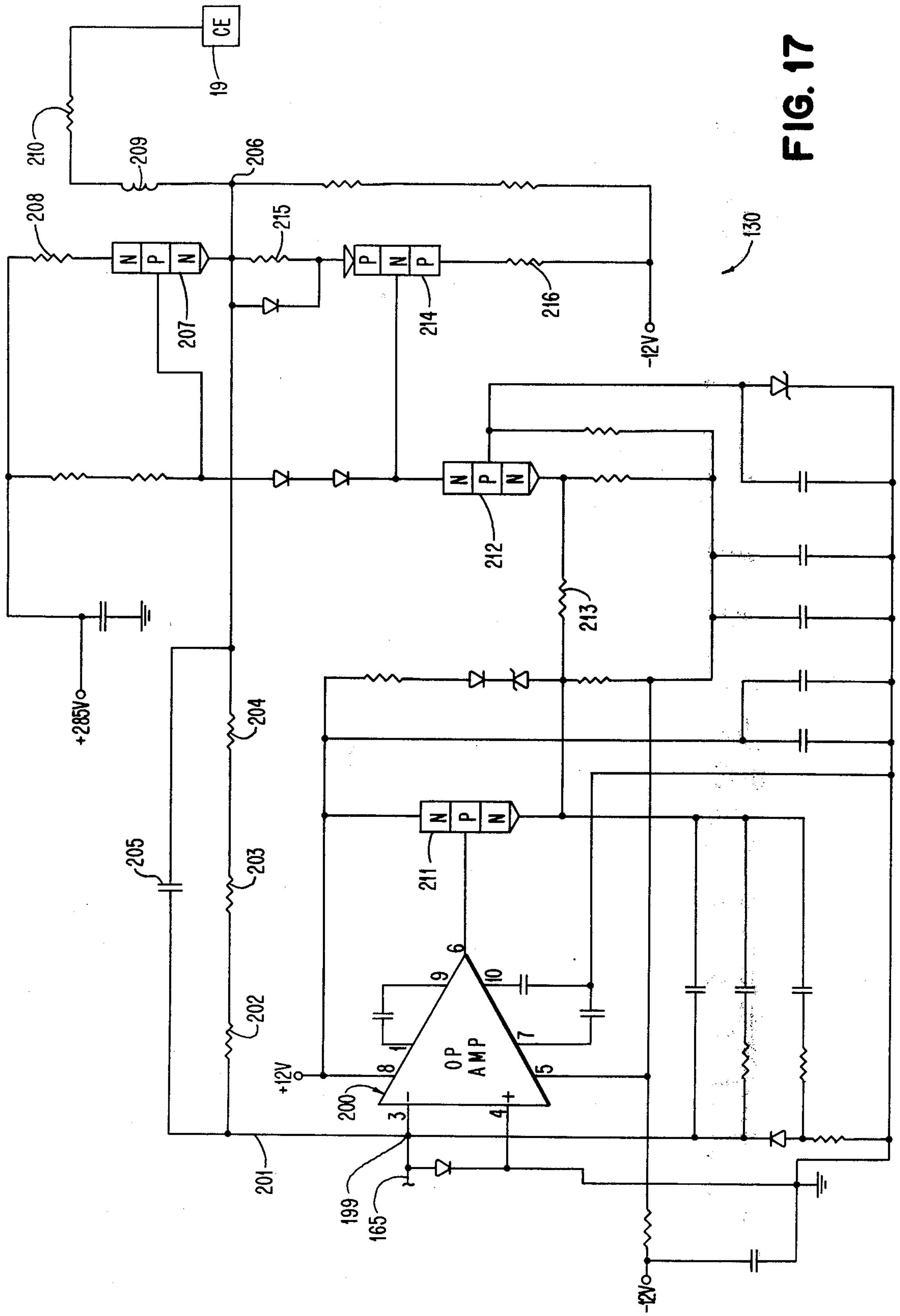
FIG. 17 is a schematic block diagram of a charge electrode driver circuit.

Referring to FIG. 17, the charge electrode driver circuit 130 has a current summing node 199 to which the line 165 from the select generator circuit 129 (see FIGS. 1 and 15) and a negative input (pin 3) of an operational amplifier 200 (see FIG. 17) are connected. The operational amplifier 200 has its positive input (pin 4) grounded. One suitable example of the operational amplifier is sold as model 715 by Fairchild.

The current summing node 199 also is connectd by a line 201 to series connected resistors 202, 203, and 204, which have a capacitor 205 in parallel therewith. The series connected resistors 202–204 are connected to an output node 206.

The output node 206 is connected through an NPN transistor 207 and a resistor 208 to a source of +285 volts. The current from the source of +285 volts flows from the output node 206 to the charge electrode 19 through an inductance 209 and a resistor 210.

When any of the transistors 161–164 (see FIG. 15) is conducting, current is drawn from the current summing node 199 (see FIG. 17) through each of the transistors 161–164 (see FIG. 15) that is conducting. This causes the output of the operational amplifier 200 (see FIG. 17) to increase to turn on an NPN transistor 211, which has its base connected to the output of the operational amplifier 200 and its emitter connected to the emitter of an NPN transistor 212 through a resistor 213.

The turning on of the transistor 211 causes the transistor 212 to turn off whereby the voltage at the base of the transistor 207 increases. This results in the voltage at the output node 206 increasing to increase the voltage to the charge electrode 19. This increase in the voltage at the output node 206 tends to turn off the operational amplifier 200. The amount of voltage pulled out of the negative input (pin 3) of the operational amplifier 200 due to the current being drawn from the current summing node 199 by one or more of the transistors 161–164 (see FIG. 15) conducting causes the transistor 207 (see FIG. 17) to be driven sufficiently conductive so that the increase in voltage at the emitter of the transistor 207 is equal to the voltage drop across the resistors 202–204.

The magnitude of the voltage at the output node 206 is determined in accordance with which of the transistors 161–164 (see FIG. 15) is conducting. A voltage of a sufficient magnitude to cause the droplet 20 (see FIG. 1) to strike the gutter 24 occurs only if the transistor 164 (see FIG. 15) is conducting irrespective of the states of the transistors 161–163 since the transistor 164 conducts only when the droplet 20 (see FIG. 1) is to be charged so as not to be printed. Each of the other transistors 161–163 (see FIG. 15) conducts in accordance with whether there is to be induced charge compensation for a particular one of the three prior droplets 20 (see FIG. 1).

Whenever the transistors 161–164 (see FIG. 15) are not drawing current out of the current summing node 199 (see (FIG. 17), the operational amplifier 200 has its output drop to turn off the transistor 211 whereby the transistor 212 turns on. This results in a PNP transistor 214, which has its base connected to the collector of the transistor 212, turning on and the transistor 207 turning off.

The transistor 214 has its emitter connected to the output node 206 through a resistor 215 and its collector connected to −12 volts through a resistor 216. When the transistor 214 is turned on due to zero input current at the current summing node 199, the output node 206 has 0 volt.

Referring to FIG. 14, there are shown the percentages of the nominal voltage supplied to the charge electrode 19 (see FIG. 1) for four consecutive droplets 20, which are to be printed, after the three previous droplets 20 have not been selected for printing. Thus, the three droplets 20 prior to the first of the four successive droplets 20 have been charged. Accordingly, there must be induced charge compensation for each of these three preceding droplets 20 when the first of the four consecutive droplets 20 to be printed is within the charge electrode 19, induction compensation for each of the two droplets 20 prior to the first of the four consecutive droplets 20 when the second of the four consecutive droplets 20 is not to be charged so as to be printed, and induction compensation for the droplet 20 prior to the first of the four successive droplets to be printed when the third of the four consecutive droplets 20 is in the charge electrode 19 and is not to be charged so as to be printed.

Therefore, when the first of the four consecutive droplets 20, which are not to be charged so as to print, is within the charge electrode 19, only the transistor 164 (see FIG. 15) is turned off. This insures that the droplet 20 (see FIG. 1) will not be charged sufficiently to strike the gutter 24 whereby the droplet 20 will print, but there will be induced charge compensation for the charge of each of the three previous droplets 20 since each of these three prior droplets 20 was charged as each did not print. Thus, as shown in FIG. 14, the charge electrode 19 receives 22% of the nominal voltage.

When the second of the four successive droplets 20 (see FIG. 1) is within the charge electrode 19 and it is not to be charged so that it will print, the transistors 163 (see FIG. 15) and 164 are turned off. Thus, there is only induction compensation for the first two of the three prior droplets 20 (see FIG. 1), but this compensation is due to those droplets 20 being the second and third droplets preceding the droplet 20 being printed. Therefore, only the AND gates 118 (see FIG. 11) and 119 are producing a high to cause the transistors 161 (see FIG. 15) and 162 to conduct. Accordingly, as shown in FIG. 14, the charge electrode 19 is receiving 7% of the nominal voltage.

When the third of the four consecutive droplets 20 (see FIG. 1) to be printed is within the charge electrode 19, there is induction compensation only for the third of the droplets 20 produced prior to the droplet 20 in the charge electrode 19. Thus, only the AND gate 119 (see FIG. 11) is producing a high at this time. As shown in FIG. 14, the charge electrode 19 receives only 3% of the nominal voltage.

When the fourth of the four successive droplets 20 (see FIG. 1) to be printed is within the charge electrode 19, all of the transistors 161–164 (see FIG. 15) are turned off. This is because the three prior droplets 20 (see FIG. 1) were not charged as each was used to print. Therefore, there is no induction compensation for the three preceding droplets 20 when the last of the four successive droplets 20 to be printed is within the charge electrode 19. Accordingly, as shown in FIG. 14, the charge electrode 19 receives zero volt.

As shown in FIG. 14, the next of the droplets 20 is to be charged since it is not to be used for printing. Thus, the AND gate 116 (see FIG. 11) has a high on its output whereby the transistor 164 (see FIG. 15) conducts while the transistors 161–163 are turned off. As a result, the charge electrode 19 (see FIG. 1) receives the nominal voltage as shown in FIG. 14; this is sufficient to deflect the droplet 20 to the gutter 24 whereby the droplet 20 will not strike the recording surface 22 to print.

Figure 5:
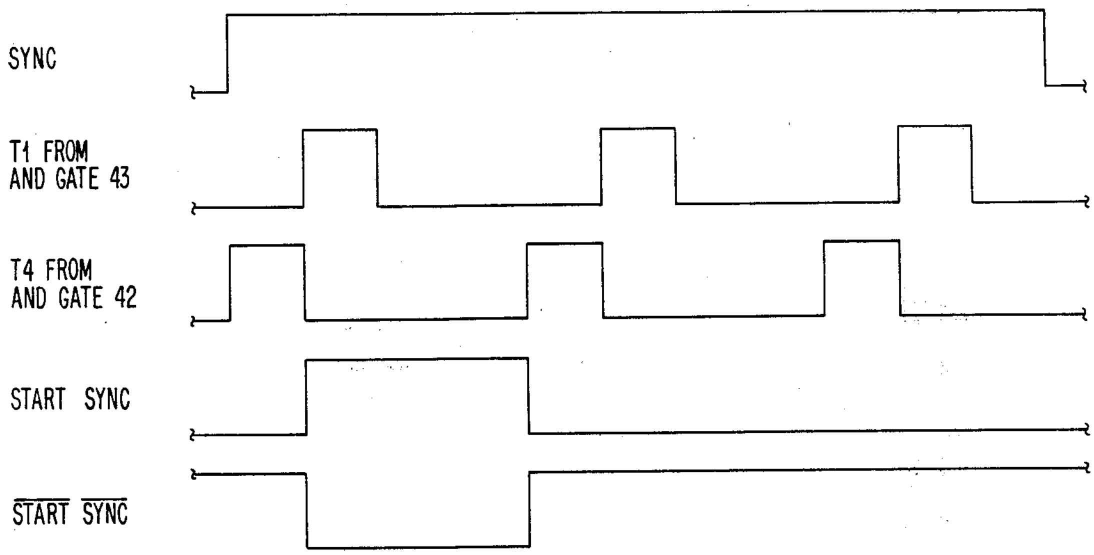
FIG. 5 is a timing diagram showing the relationship of various signals produced by the circuit of FIG. 4.

Considering the operation of the present invention, a synchronization sequence is started by causing a SYNC signal to the D input of the latch 51 (see FIG. 4) to go high. As shown in FIG. 5, this results in the START SYNC signal from the AND gate 53 (see FIG. 4) going high on the next occurrence of the T1 signal from the AND gate 43 (see FIG. 2) going up and the START SYNC signal going down when the T4 signal from the AND gate 42 goes up.

When the START SYNC signal goes up, the $\overline{\text{START SYNC}}$ signal from the inverter 55 (see FIG. 4) goes down whereby the END signal from the Q output of the latch 115 (see FIG. 6) goes down since the $\overline{\text{START SYNC}}$ signal is supplied to the CLR input of the latch 115. This relationship of the END and $\overline{\text{START SYNC}}$ signals is shown in FIG. 9.

When the END signal goes low, the print shift register 125 (see FIG. 11) receives no further signals at its CLK input from the OR gate 132 (see FIG. 12). This is because the END signal, which is an input to each of the AND gates 133–136, is down.

Because the END signal from the Q output of the latch 115 (see FIG. 6) also is supplied to the CLR input of the print pattern shift register 125 (see FIG. 11), all of the pins 10–13 of the print pattern shift register 125 go to a logical zero. Therefore, each of the inverters 121–124 has a high as its output since its input is now a logical zero.

Accordingly, the output of each of the AND gates 116–119 will be the same logical level as the TABC signal from the output of the OR gate 81 (see FIG. 8). Thus, when the TABC signal goes high, all of the AND gates 116–119 (see FIG. 11) produce a high to cause the maximum voltage to be supplied to the charge electrode 19 (see FIG. 1).

Figure 18:
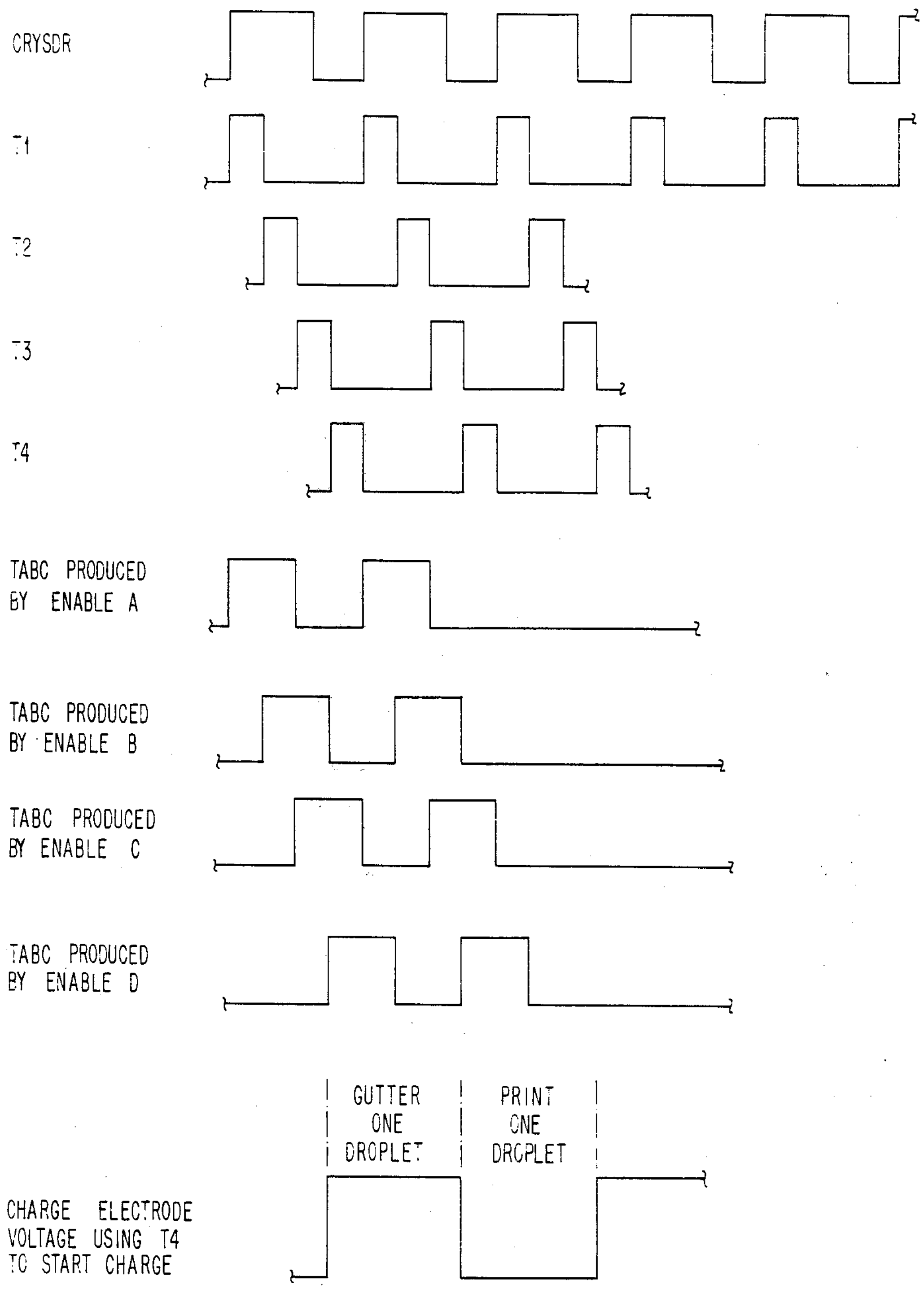
FIG. 18 is a timing diagram showing the relationship of various signals produced by the circuit of FIGS. 2 and 8.

When the START SYNC signal goes up, the single shot 56 (see FIG. 6) supplies a high ENABLE A signal on its Q output. This results in the single shot 73 (see FIG. 8) providing a high AP signal at its Q output whereby the OR gate 75 supplies a high PUL signal as one of the two inputs to the AND gate 75'. When the SECOND signal from the OR gate 67 (see FIG. 7) goes up due to the T3 signal to the AND gate 62 from the AND gate 44 (see FIG. 2) going high, the latches 68 (see FIG. 8), 69, 71, 72, and 76, the AND gates 79 and 82, and the OR gate 80 cooperate to cause the OR gate 81 to supply two high TABC signals during the T1 and T2 times of two adjacent cycles as shown in FIGS. 9 and 18.

As shown in FIG. 9, a GAP signal from the analog gap deflection circuit 31 (see FIG. 1) is assumed to go high to indicate that the two adjacent droplets 20 were charged during the T1 and T2 times that the charge voltage was applied to the charge electrode 19.

With the GAP signal being high, both of the inputs to the AND gate 59 (see FIG. 6) are high. Thus, when the GAP signal goes up, the latch 83 has the A signal at its Q output go high as shown in the timing diagram of FIG. 9.

When the ENABLE A signal from the Q output of the single shot 56 goes down and this is determined by the time constant of the resistor 57 and the capacitor 58, the single shot 85 produces a high ENABLE B signal at its Q output. This is supplied to the single shot 91 (see FIG. 8) whereby the BP signal at its Q output goes up to cause the PUL signal from the OR gate 75 to be high.

Accordingly, when the SECOND signal from the OR gate 67 (see FIG. 7) goes high due to the T4 signal to the AND gate 90 going high, the latches 68 (see FIG. 8), 69, 71, 72, and 76, the AND gates 79 and 82, and the OR gate 80 cooperate to cause the OR gate 81 to produce two high TABC signals during the T2 and T3 times of two adjacent cycles as shown in FIGS. 9 and 18. As shown in FIG. 9, it is assumed that charging of the two adjacent droplets 20 (see FIG. 1) occurs during the T2 and T3 times whereby the GAP signal from the analog gap detection circuit 31 goes high.

This results in both of the inputs to the AND gate 88 (see FIG. 6) being high with the latch 94 transferring the high at its D input to its Q output when the GAP signal at the AND gate 88 goes high. The high B signal at the Q output of the latch 94 is shown in FIG. 8 as occurring when the GAP signal goes up.

When the ENABLE B signal from the Q output of the single shot 85 goes down, the single shot 95 produces a high ENABLE C signal at its Q output. This causes the single shot 103 (see FIG. 8) to produce a high CP signal at its Q output whereby the OR gate 75 has a high PUL signal. Therefore, when the SECOND signal to the AND gate 75' from the OR gate 67 (see FIG. 7) goes high due to the T1 signal to the AND gate 100 going up, the latches 68 (see FIG. 8), 69, 71, 72, and 76, the AND gates 79 and 82, and the OR gate 80 cooperate to cause the OR gate 81 to produce two positive TABC signals during the T3 and T4 times of two adjacent cycles as shown in FIGS. 9 and 18.

As shown in FIG. 9, there is no high GAP signal during this time because this assumed example had the break off of the droplet 20 occurring during the T2 time. Thus, the C signal from the Q output of the latch 105 (see FIG. 6) never goes up because the GAP signal to the AND gate 98 is not high when the ENABLE C signal to the AND gate 98 is high.

When the ENABLE C signal from the single shot 95 goes down, the single shot 106 has a high ENABLE D signal at its Q output. This results in the single shot 111 (see FIG. 8) having the DP signal at its Q output go up whereby the PUL signal at the output of the OR gate 75 is high.

Accordingly, the next occurrence of the SECOND signal from the OR gate 67 (see FIG. 7) occurs when the T2 signal to the AND gate 110 goes up. This causes the latches 68 (see FIG. 8), 69, 71, 72, and 76, the AND gates 79 and 82, and the OR gate 80 to cooperate to produce two high TABC signals from the output of the OR gate 81 during the T4 and T1 times of two adjacent cycles as shown in FIGS. 9 and 18.

As shown in FIG. 9, no high GAP signal occurs during this time. This is because charging of the droplets 20 (see FIG. 1) occurred when the ENABLE A and ENABLE B signals were up in the assumed example.

Accordingly, the D signal from the Q output of the latch 114 (see FIG. 6) stays low as indicated in FIG. 9. This is because there is no high GAP signal to the AND gate 108 when the ENABLE D signal from the single shot 106 is high.

When the $\overline{\text{ENABLE D}}$ signal at the $\overline{\text{Q}}$ output of the single shot 106 goes up, the END signal of the Q output of the latch 115 goes up. This stops the synchronization sequence.

The high END signal causes the output of the OR gate 81 (see FIG. 8) to provide a high TABC signal at all times. When the END signal goes high, it has no further effect on the print pattern shift register 125 (see FIG. 11). Therefore, the CCHZSW signal to the CLK input of the print pattern shift register 125 controls clocking of the signals from the input line 131 to each of pins 10–13 of the print pattern shift register 125.

With the TABC signal always being high, the inputs to the AND gates 116–119 are again controlled by the outputs of the inverters 121–124. Thus, the desired printing or non-printing of each of the droplets 20 (see FIG. 1) is controlled by the CDATAIN signals on the input line 131 (see FIG. 11).

Since the A and B signals from the latches 83 (see FIG. 6) and 94, respectively, went high in the assumed example, this causes the AND gate 142 (see FIG. 13D) to have a high output. Accordingly, the AND gate 136 (see FIG. 12) provides the CCHZSW signal to the CLK input of the print pattern shift register 125 (see FIG. 11) in accordance with when the T4 signal goes up. This is because the break off of the droplet 20 (see FIG. 1) is occurring during the T2 time in the assumed example since the GAP signal went up each time that the T2 signal was up during charging of the two droplets 20.

While the present invention has shown and described the droplets 20 being charged during adjacent quarters of two successive cycles of the application of the disturbance to the stream 18 by the crystal driver circuit 35, it should be understood that such is not a requisite for satisfactory operation. Each of the two adjacent cycles could be divided into different segments than quarters, if desired, with a sufficient number of cycles of periodic application occurring to enable determination of when the charge is applied to the droplets 20. It also is not necessary that there be overlapping of the time periods of the charging of the droplets 20 during different periodic applications of the disturbance to the stream 18.

An advantage of this invention is that no deflection voltage is required to synchronize the droplets. Another advantage of this invention is that it shortens the flight path of the droplets in comparison with apparatus previously available for synchronizing the charging of droplets. A further advantage of this invention is that there is no contamination of the deflection plates. Still another advantage of this invention is that it avoids droplets being improperly charged because of break off occurring at a time prior to the voltage to the charge electrode being settled. A still further advantage of this invention is the capability of synchronizing charging without moving off the recording surface to a separately mounted sensor position. Yet another advantage of this invention is the shorter time required to accomplish synchronization.

While the invention has been particularly shown and described with reference to a preferred embodiment thereof, it will be understood by those skilled in the art that various changes in form and details may be made therein without departing from the spirit and scope of the invention.

What is claimed is:

1. A method for determining the time of formation of droplets of a pressurized conductive liquid stream relative to the application of a disturbance to the stream to produce the droplets from the stream including:

- supplying a pressurized conductive liquid stream;
- applying a disturbance to the stream at a selected frequency to break up the stream into droplets at a predetermined break-off point with the droplets being spaced substantially uniform distances;
- periodically applying a charge to the stream during the same portion of each of two adjacent cycles of the disturbance, applying the charge during a different portion of the two adjacent cycles for each periodic application;
- periodically applying the charge for a selected number of periodic applications;
- and determining the portion of the two adjacent cycles that causes charging of the two adjacent droplets by sensing the presence of a gap between the two adjacent droplets at a predetermined distance from the predetermined break-off point of the droplets with the gap being greater than the substantially uniform distance between adjacent droplets.

2. The method according to claim 1 including optically sensing the presence of the gap at the predetermined distance.

3. The method according to claim 2 including:

- applying the charge to the stream during two adjacent quarters of each of the two adjacent cycles during each periodic application with one of the two adjacent quarters of each periodic application being included with the next periodic application;
- and the selected number of the periodic applications is four.

4. The method according to claim 3 in which the liquid stream is an ink stream.

5. The method according to claim 1 including:

applying the charge to the stream during two adjacent quarters of each of the two adjacent cycles during each periodic application with one of the two adjacent quarters of each periodic application being included with the next periodic application;

and the selected number of the periodic applications is four.

6. An apparatus for determining the time of formation of droplets of a pressurized conductive liquid stream relative to the application of a disturbance to the stream to produce the droplets from the stream including:

means to supply a pressurized conductive liquid stream;

periodic means acting on the stream to cause break up of the stream into droplets at a predetermined break-off point with the droplets being spaced substantially uniform distances;

charging means to apply a charge to the stream adjacent the predetermined break-off point of the droplets;

means to periodically apply the charge of said charging means to the stream during the same portion of each of two adjacent cycles of said periodic means, said periodically applying means applying the charge for a selected number of periodic applications;

means to cause said periodically applying means to apply the charge during a different portion of the two adjacent cycles for each periodic application by said periodically applying means;

and means to determine the portion of the two adjacent cycles that causes charging of the two adjacent droplets by sensing the presence of a gap between the two adjacent droplets at a predetermined distance from the predetermined break-off point of the droplets with the gap being greater than the substantially uniform distance between adjacent droplets.

7. The apparatus according to claim 6 in which said determining means includes means to optically sense the presence of the gap at the predetermined distance.

8. The apparatus according to claim 7 in which:

said causing means causes application of the charge during two adjacent quarters of each of the two adjacent cycles of said periodic means with one of the two adjacent quarters of each periodic application being included with the next periodic application;

and the selected number of the periodic applications is four.

9. The apparatus according to claim 8 in which said periodic means comprises vibration means.

10. The apparatus according to claim 9 in which said supply means supplies an ink stream.

11. The apparatus according to claim 6 in which said periodic means comprises vibration means.

12. The apparatus according to claim 11 in which:

said causing means causes application of the charge during two adjacent quarters of each of the two adjacent cycles of said periodic means with one of the two adjacent quarters of each periodic application being included with the next periodic application;

and the selected number of the periodic applications is four.

13. The apparatus according to claim 6 in which:

said causing means causes application of the charge during two adjacent quarters of each of two adjacent cycles of said periodic means with one of the two adjacent quarters of each periodic application being included with the next periodic application;

and the selected number of the periodic applications is four.

14. A method for synchronizing the charging of each droplet of a pressurized conductive liquid stream to be charged with the time of formation of the droplets from the stream including:

supplying a pressurized conductive liquid stream;

applying a disturbance to the stream at a selected frequency to break up the stream into droplets at a predetermined break-off point with the droplets being spaced substantially uniform distances;

periodically applying a charge to the stream during the same portion of each of two adjacent cycles of the disturbance, applying the charge during a different portion of the two adjacent cycles for each periodic application;

periodically applying the charge for a selected number of periodic applications;

determining the portion of the two adjacent cycles that causes charging of the two adjacent droplets by sensing the presence of a gap between the two adjacent droplets at a predetermined distance from the predetermined break-off point of the droplets with the gap being greater than the substantially uniform distance between adjacent droplets;

and applying the charge to the stream in accordance with the determination of when the gap exists between the two adjacent droplets and whether the formed droplet is to be charged to cause charging of each of the droplets to be charged.

15. The method according to claim 14 including optically sensing the presence of the gap at the predetermined distance.

16. The method according to claim 15 including:

applying the charge to the stream for determining the time of formation of the droplets during two adjacent quarters of each of the two adjacent cycles during each periodic application with one of the two adjacent quarters of each periodic application being included with the next periodic application;

and the selected number of the periodic applications is four.

17. The method according to claim 16 in which the liquid stream is an ink stream.

18. The method according to claim 14 including:

applying the charge to the stream for determining the time of formation of the droplets during two adjacent quarters of each of the two adjacent cycles during each periodic application with one of the two adjacent quarters of each periodic application being included with the next periodic application;

and the selected number of the periodic applications is four.

19. An apparatus for synchronizing the charging of each droplet of a pressurized conductive liquid stream to be charged with the time of formation of the droplets from the stream including:

means to supply a pressurized conductive liquid stream;

periodic means acting on the stream to cause break up of the stream into droplets at a predetermined break-off point with the droplets being spaced substantially uniform distances;

charging means to apply a charge to the stream adjacent the predetermined break-off point of the droplets;

means to periodically apply the charge of said charging means to the stream during the same portion of each of two adjacent cycles of said periodic means for determining the tine of formation of the droplets, said periodically applying means applying the charge for a selected number of periodic applications;

means to cause said periodically applying means to apply the charge during a different portion of the two adjacent cycles for each periodic application by said periodically applying means when determining the time of formation of the droplets;

means to determine the portion of the two adjacent cycles that causes charging of the two adjacent droplets by sensing the presence of a gap between the two adjacent droplets at a predetermined distance from the predetermined break-off point of the droplets with the gap being greater than the substantially uniform distance between adjacent droplets;

and means to apply the charge to the stream in accordance with the determination by said determining means of when the gap exists between the two adjacent droplets and whether the formed droplet is to be charged to cause charging of each of the droplets to be charged.

20. The apparatus according to claim 19 in which said determining means includes means to optically sense the presence of the gap at the predetermined distance.

21. The apparatus according to claim 20 in which:

said causing means causes application of the charge for determining the time of formation of the droplets during two adjacent quarters of each of the two adjacent cycles of said periodic means with one of the two adjacent quarters of each periodic application being included with the next periodic application;

and the selected number of the periodic applications is four.

22. The apparatus according to claim 21 in which said periodic means comprises vibration means.

23. The apparatus according to claim 22 in which said supply means supplies an ink stream.

24. The apparatus according to claim 19 in which said periodic means comprises vibration means.

25. The apparatus according to claim 24 in which:

said causing means causes application of the charge for determining the time of formation of the droplets during two adjacent quarters of each of the two adjacent cycles of said periodic means with one of the two adjacent quarters of each periodic application being included with the next periodic application;

and the selected number of the periodic applications is four.

26. The apparatus according to claim 19 in which:

said causing means causes application of the charge for determining the time of formation of the droplets during two adjacent quarters of each of the two adjacent cycles of said periodic means with one of the two adjacent quarters of each periodic application being included with the next periodic application;

and the selected number of the periodic applications is four.

* * * * *